(12) United States Patent
Salama et al.

(10) Patent No.: US 7,457,290 B1
(45) Date of Patent: *Nov. 25, 2008

(54) METHOD AND APPARATUS FOR AUTOMATIC INTER-DOMAIN ROUTING OF CALLS

(75) Inventors: Hussein Farouk Salama, Sunnyvale, CA (US); David R. Oran, Acton, MA (US); Dhaval N. Shah, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 998 days.

This patent is subject to a terminal disclaimer.

(21) Appl. No.: 10/426,459

(22) Filed: Apr. 29, 2003

Related U.S. Application Data

(63) Continuation of application No. 09/225,921, filed on Jan. 5, 1999, now Pat. No. 6,584,093.

(60) Provisional application No. 60/097,866, filed on Aug. 25, 1998.

(51) Int. Cl.
*H04L 12/56* (2006.01)

(52) U.S. Cl. ...................... 370/392; 370/400

(58) Field of Classification Search ......... 370/352–356, 370/401, 410, 395.2–395.21, 522, 351, 389, 370/392, 400
See application file for complete search history.

(56) References Cited

U.S. PATENT DOCUMENTS

| | | | | |
|---|---|---|---|---|
| 5,218,676 A | * | 6/1993 | Ben-Ayed et al. | 709/240 |
| 5,361,256 A | * | 11/1994 | Doeringer et al. | 370/60 |
| 5,519,704 A | * | 5/1996 | Farinacci et al. | 370/85.13 |
| 5,774,660 A | * | 6/1998 | Brendel et al. | 709/201 |
| 5,828,665 A | * | 10/1998 | Husak | 370/395.53 |
| 5,867,494 A | * | 2/1999 | Krishnaswamy et al. | 370/352 |
| 5,881,243 A | * | 3/1999 | Zaumen et al. | 395/200.71 |
| 6,009,081 A | * | 12/1999 | Wheeler et al. | 370/255 |
| 6,078,582 A | * | 6/2000 | Curry et al. | 370/356 |
| 6,101,549 A | * | 8/2000 | Baugher et al. | 709/238 |
| 6,260,070 B1 | * | 7/2001 | Shah | 709/230 |
| 6,292,479 B1 | * | 9/2001 | Bartholomew et al. | 370/352 |
| 6,339,595 B1 | * | 1/2002 | Rekhter | 370/392 |
| 6,351,465 B1 | * | 2/2002 | Han | 370/395 |

\* cited by examiner

*Primary Examiner*—Chi H. Pham
*Assistant Examiner*—Tri H. Phan
(74) *Attorney, Agent, or Firm*—Stolowitz Ford Cowger LLP

(57) ABSTRACT

A method and apparatus for inter-domain routing of calls in a network, where the network represents a first wide area network. A routing node of the network advertises its access to a range of addresses in a second wide area network and a cost for access to the range of addresses to all adjacent nodes in the network. Each of the adjacent nodes inserts an entry in its own routing table associating access to the range of addresses in the second wide area network with the network address of the routing node and the cost for access. Each adjacent node then modifies the cost for access by adding its own cost and advertises its access to the range of addresses in the second wide area network and the modified cost for access to all of its adjacent nodes. When a call addressed to a destination address in the range of address in the second wide area network is received at each node of the network, then the node searches for the entry in its routing table corresponding to the range of addresses in the second wide area network having the lowest cost for access and connects the call to the adjacent node associated with the entry having the lowest cost. The routing node can also advertise one or more protocol types which it can support, where the protocol types are associated with the routing node in the routing table in each adjacent node and a call having a given protocol type is also routed at each node of the network based upon its protocol type.

24 Claims, 17 Drawing Sheets

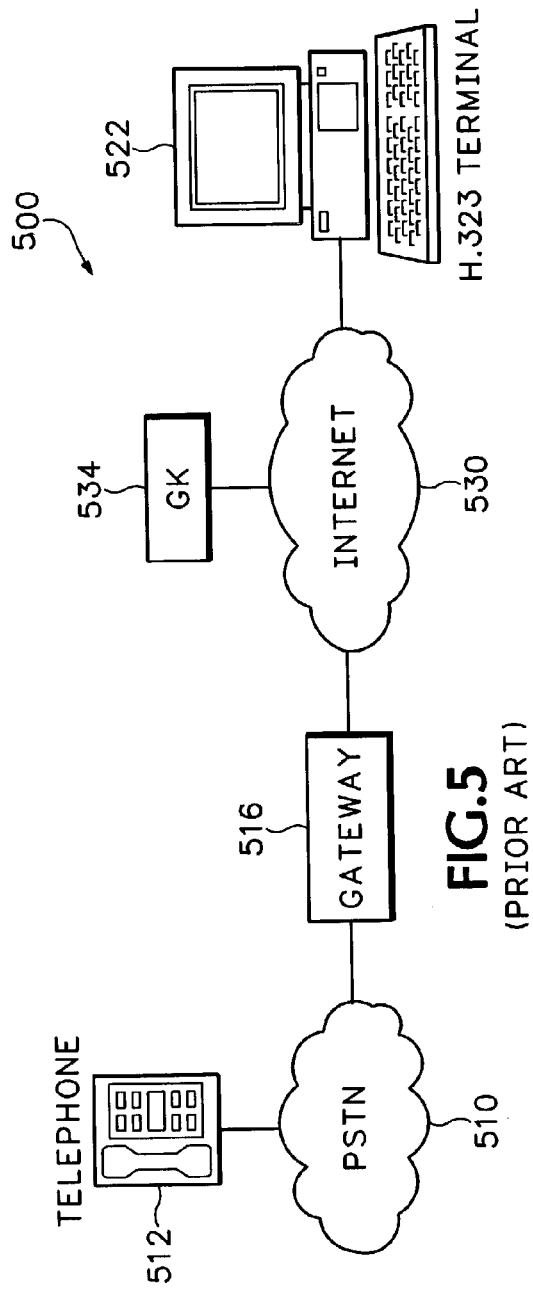
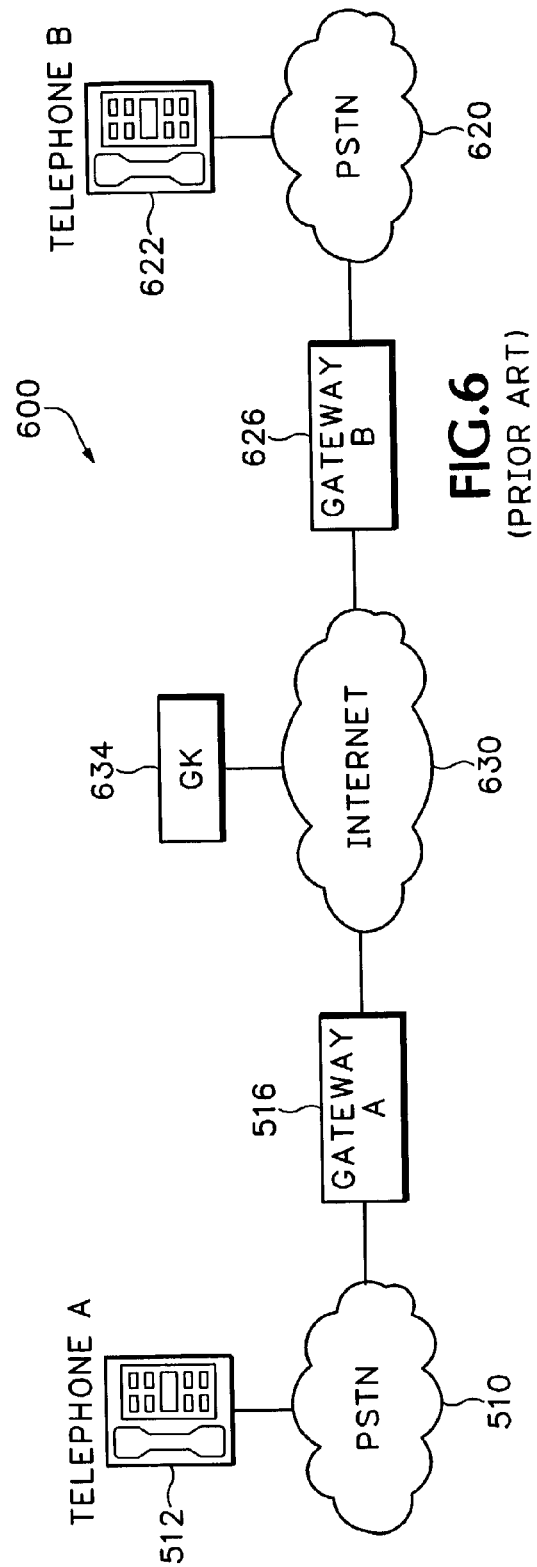
FIG.5 (PRIOR ART)
FIG.6 (PRIOR ART)

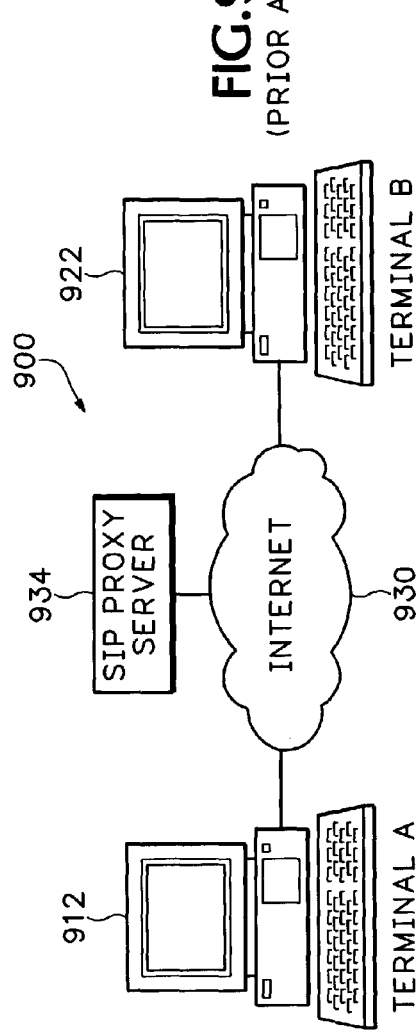
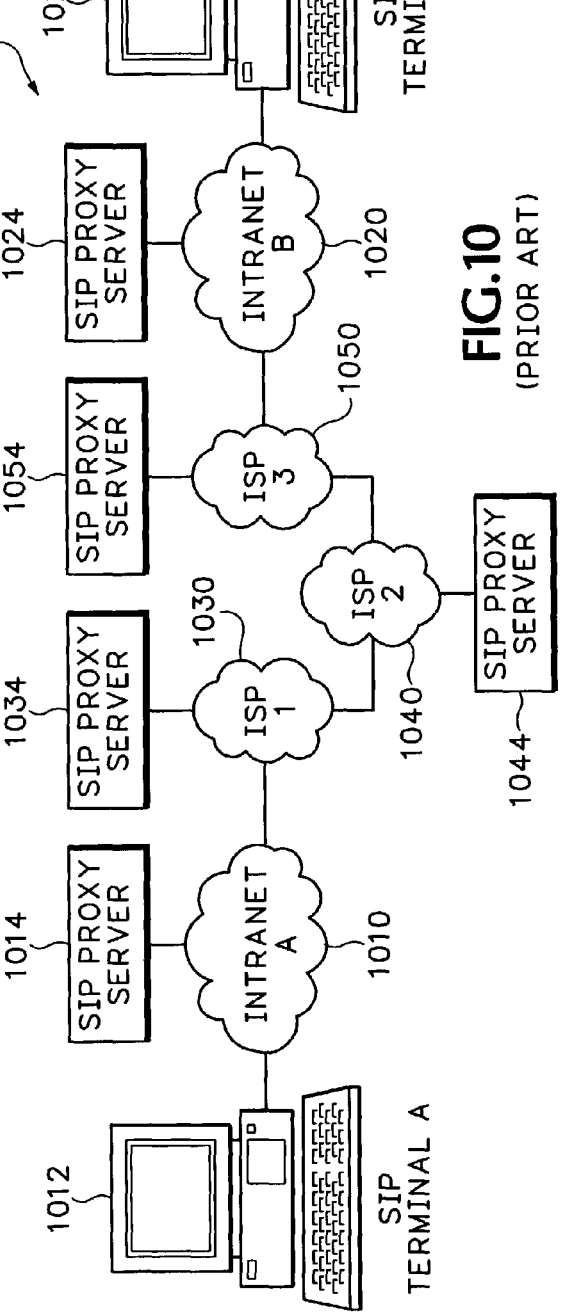

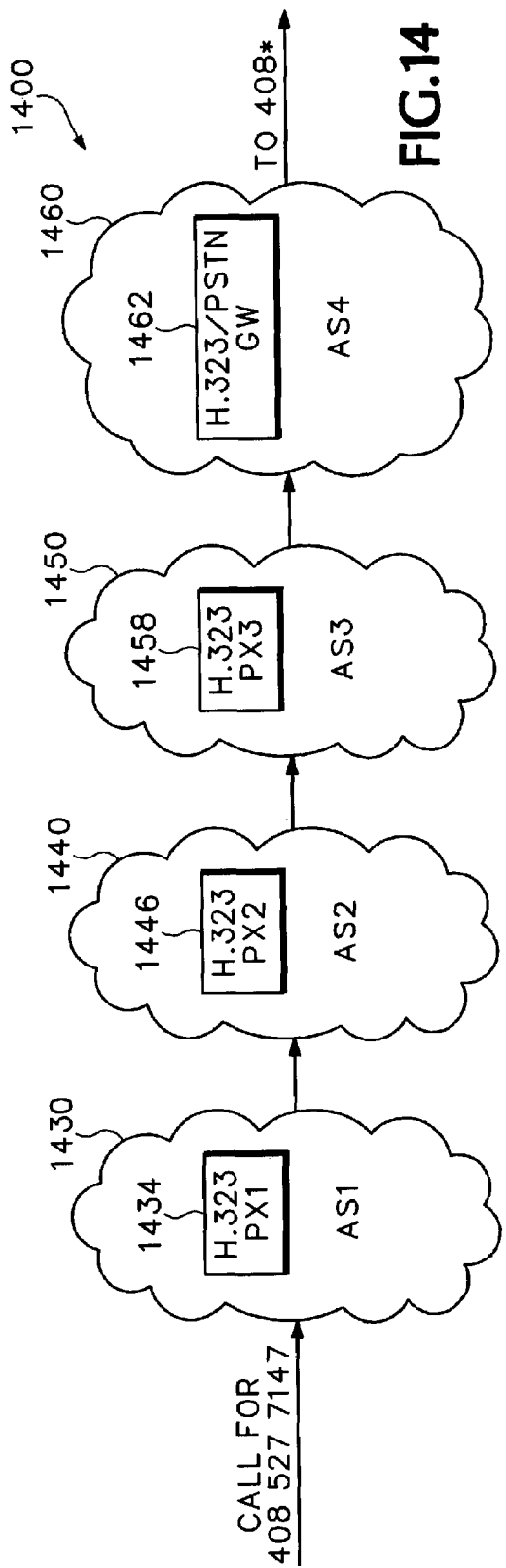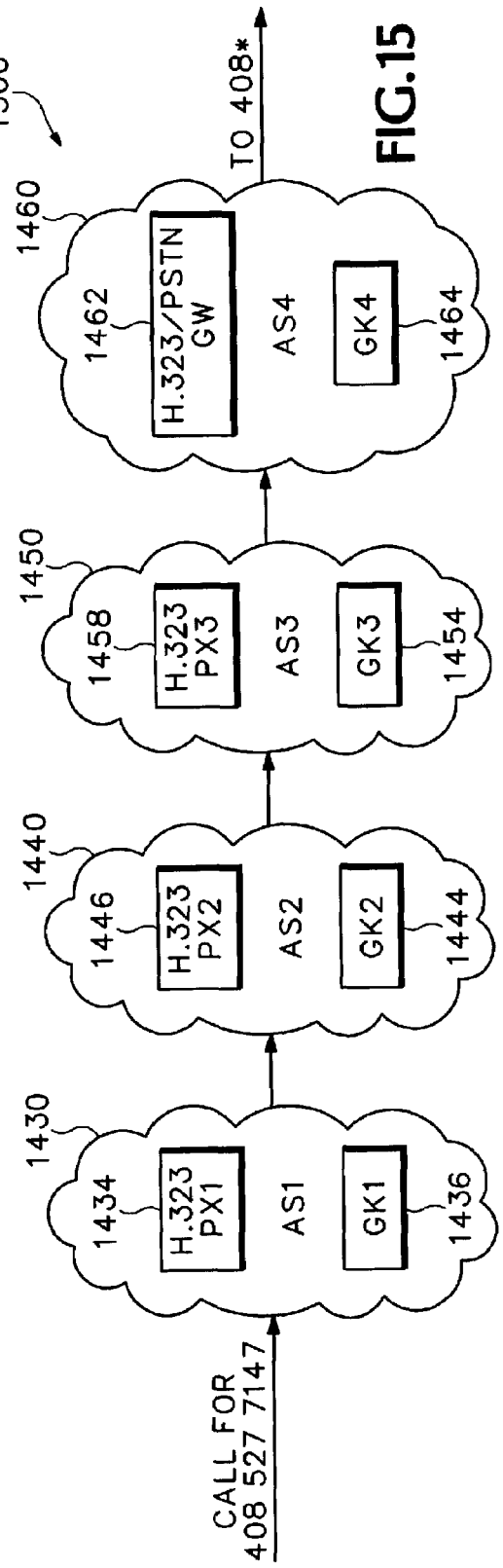

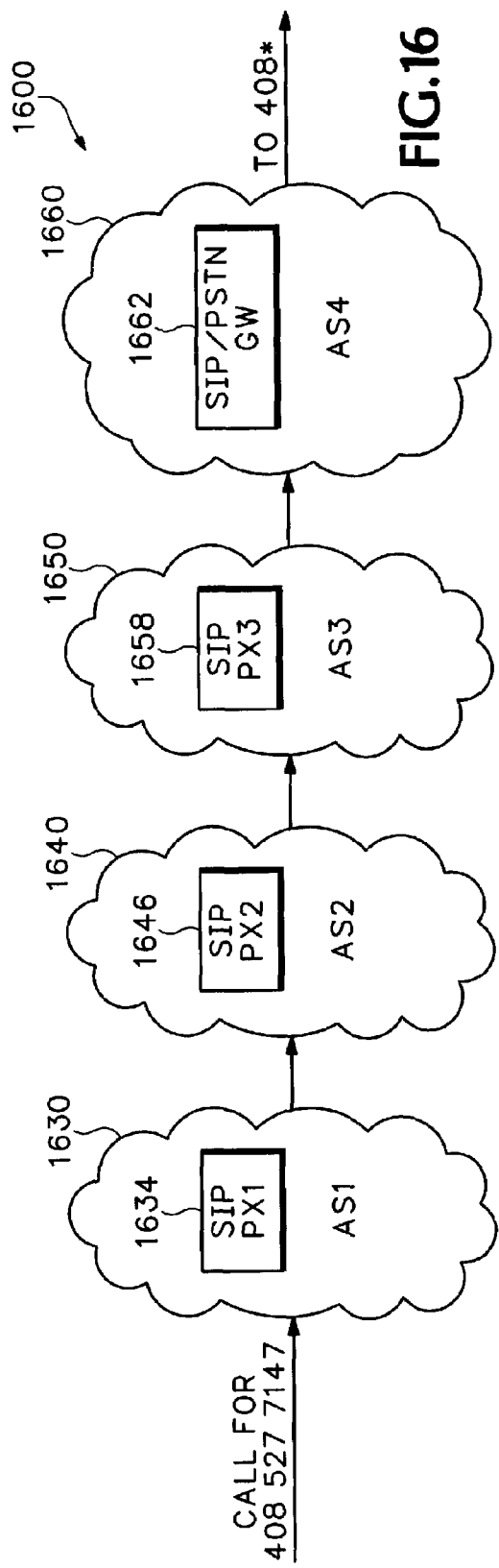
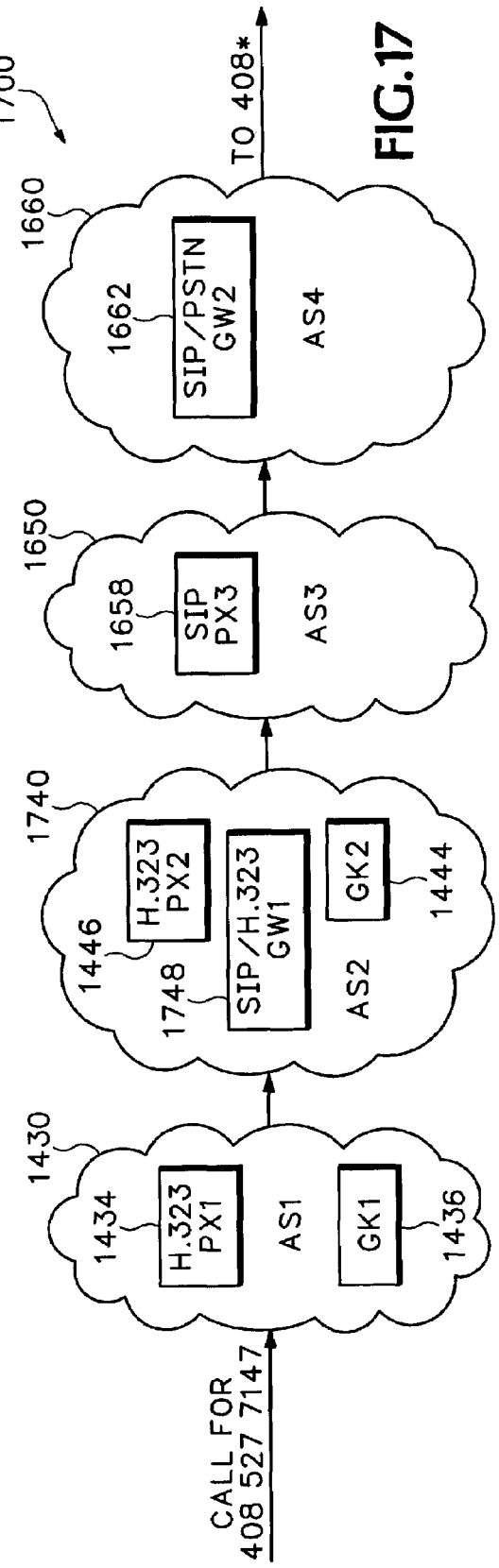

METHOD AND APPARATUS FOR AUTOMATIC INTER-DOMAIN ROUTING OF CALLS

This application is a Continuation of prior U.S. application Ser. No. 09/225,921, filed Jan. 5, 1999 now U.S. Pat. No. 6,584,093 which claims priority from U.S. Provisional Application Ser. No. 60/097,866, filed Aug. 25, 1998.

FIELD OF THE INVENTION

The present invention relates generally to call routing and, more particularly, to automatic routing between domains.

BACKGROUND OF THE INVENTION

Internet Telephony allows telephone calls to be carried over an Internet protocol (IP) network either end-to-end between two telephones or computers, or as one or more "hops" in an end-to-end telephone call. A major objective in creating an internet telephony system is to reduce the cost of voice calls while maintaining the same quality level currently provided in voice networks. To achieve this objective a voice call may have to be routed over multiple hops, with some of these hops being in the data network while others are in the voice network.

Internet telephony calls are created, managed, and torn down by signaling protocols. These signaling protocols, when combined with a method of routing the signaling messages and maintaining call state allow the actual media (i.e. voice) to flow in packets between the endpoints. The standards organizations are currently evolving two Internet Telephony signaling protocols: H.323 and SIP. A call routing scheme can be developed separately for each signaling protocol, but it is highly desirable to separate the routing function from other control functions of the Internet, as has been done for the routing of IP data packets.

The routing of telephone calls in the public switched telephone network (PSTN) is accomplished by a combination of common channel signaling (CCS), such as Signaling System #7 (SS7), a number of translation facilities in elements called Service Control Points (SCPs), and static routing tables in elements called Service Switching Points (SSPs). While the CCS routing architecture is a reasonable solution for the PSTN, this architecture has a number of serious limitations, not the least of which is the use of static routing tables in the SSPs. It also suffers from poor separation of the name→address translation function (e.g. 800 number→destination port) from the configuration of the routing machinery of the PSTN.

Initial deployments of Internet telephony have been designed to be similar to the PSTN and use static routing tables in network endpoints, gateways, or centralized call control elements called gatekeepers. An example of a simplified internet telephony system architecture 100 is shown in FIG. 1.

In architecture 100, terminal 12 is connected to intranet 10 which has a gatekeeper 14 which acts as a routing agent for intranet 10. Terminal 22 is connected to intranet 20 which has a gatekeeper 24 which acts as a routing agent for intranet 20. Intranets 10 and 20 are each connected to Internet 30.

In the configuration 100 of FIG. 1, a call is routed from terminal 12 to terminal 14 using the routing tables in gatekeepers 14 and 24. One problem with the conventional internet telephony system 100 has no distributed routing protocol to ease the maintenance and distribution of routing information among the elements of the system.

As mentioned above, two Internet Telephony protocols are presently evolving within the standards organizations: H.323 and SIP. The two protocols are discussed in the next two sections with emphasis on how they achieve multi-hop call routing. Then we describe how to achieve distributed multi-hop call routing. We also discuss the addressing formats used in Border Gateway Protocol (BGP) which is used for routing of IP data packets in the backbone of the Internet.

The H.323 Architecture

Recommendation H.323 is a standard architecture for multimedia conferencing (voice, video, and, data) in packet-based networks that was designed by the ITU-T. H.323 has been successfully applied as a suite of signaling protocols for Internet Telephony.

The main components involved in H.323 conferencing are:
Terminals: an H.323 terminal is an endpoint capable of generating audio, video, and data streams or any combination thereof.
Gatekeepers: a gatekeeper is an H.323 entity that provides address resolution and controls access for all types of H.323 endpoints. In addition, a gatekeeper may perform other services such as accounting and authentication.
Multipoint Control Units (MCU): an MCU is an H.323 endpoint which provides the capability for three or more terminals to participate in a multipoint conference.
Gateways: an H.323 gateway is an endpoint that translates from/to H.323 to/from another multimedia conferencing protocols such as H.320 (conferencing on ISDN), or SIP. The gateways with the most relevance to Internet telephony are the voice gateways which are H.323/PSTN gateways and which carry voice only.
Proxies: While not part of the H.323 standard, Cisco provides for an H.323 proxy. It behaves like an H.323/H.323 gateway. Useful features of the proxy include quality of service (QoS), Security, and Application Specific Routing (ASR). ASR involves forcing multimedia streams to follow specific routes path towards the destination).

The main signaling protocols required to implement the H.323 architecture are:
RAS: Registration, Admission, and Status. It is a UDP-based protocol used for communication between H.323 endpoints and the gatekeeper and also for inter-gatekeeper communication. It is part of the H.225 recommendation.
Q.931: is the signaling protocol used for connection establishment between two endpoints. It is part of the H.225 recommendation.
H.245: is the signaling protocol responsible for call control between endpoints. It provides for capability exchange, channel and coder/decoder (codec) negotiation, and several other functions.
RTP: is the protocol used for carrying the real-time media streams over IP networks.
T.120: is the architecture used for sharing data between endpoints participating in a conference.

A gatekeeper administers one or more H.323 zones. Calls between endpoints in the same zone typically consist of a single hop. On the other hand, inter-zone calls will usually consist of multiple hops (called legs). Some examples will be described below which illustrate the operation of H.323 and the problems involved with multi-hop calls.

FIG. 2 illustrates an example 200 of H.323 call set-up. In FIG. 2, a call is established directly between the terminals 12 and 22 and therefore consists of only one hop.

However, the H.323 recommendation also defines a signaling model for gatekeeper routed calls. In the gatekeeper model, the Q.931 and H.245 signaling may flow through a gatekeeper while the RTP media streams still flow directly between the terminals, as in FIG. 2. In this case, the signaling part of the call consists of two call legs: one call leg from terminal 12 to gatekeeper 14; and one call leg from gatekeeper 14 to terminal 22.

Routing calls to H.323 terminals, or other entities, outside the caller's local area system requires multi-hop routing. Several solutions have been proposed which involve: manual configuration of gatekeepers; inter-gatekeeper communication; and the use of directory servers. Most of these solutions consider only calls consisting of one call leg, and none of them scale well to large networks nor provide for dynamic update of call routes over time.

An Internet Service Provider (ISP) may also wish to enforce certain Quality of Service (QoS) and security policies on H.323 calls. To achieve this, the call may be directed through proxies 16 and 26, as shown in the architecture 300 of FIG. 3.

This call setup works as follows:

Terminal 12 requests admission from its gatekeeper 14, to call Terminal 22. Admission typically includes at least: authorizing of the call, resolution of the destination address; and accounting for the call.

Gatekeeper 14 directs Terminal 12 to connect to Proxy 16.

Terminal 12 connects to Proxy 16.

Proxy 16 receives the call and queries Gatekeeper 14 on how to forward the call.

Gatekeeper 14 instructs Proxy 16 to connect to Proxy 26.

Proxy 16 connects to Proxy 26.

Proxy 26 receives the call and queries Gatekeeper 24 on how to forward the call.

Gatekeeper 24 instructs Proxy 26 to connect to Terminal 22.

Proxy 26 connects to Terminal 22.

The Q.931 and H.245 signaling for the call, as well as the RTP streams, all pass through the proxies 16 and 26. In the example of FIG. 3, the call consists of three call legs (layer 7 hops). Cisco gatekeepers and proxies can implement a three-hop call, such as the one demonstrated in FIG. 3, by isolating the source zone, i.e. intranet 10, and the destination zone, i.e. intranet 20, from the rest of the network 30.

The situation can be further complicated by decomposing the Internet cloud 30 of FIG. 3 into multiple ISP networks as shown in FIG. 4. In multiple ISP networks, each ISP can have different policies. Therefore each ISP places proxies at the border of its network and forces all incoming H.323 calls to go through these proxies in order to enforce its specific policies on the calls.

In the network architecture 400 of FIG. 4, proxy 16 is coupled to ISP network 430 which includes gatekeeper 434. ISP network 430 is connected through proxy 436 to ISP network 440. ISP network 440 includes gatekeeper 444 and is connected to ISP 450 through proxy 446. ISP network 450 includes gatekeeper 454 and is connected to proxy 26.

In the example of FIG. 4, a call from Terminal 12 to Terminal 22 will consist of five call legs. In conventional internet telephony technology, there is no mechanism available that can realize such a multi-hop (more than three hops) scenario. Once the call leaves the source zone by passing through proxy 16 to ISP network 430 and then on to ISP network 440, the application layer addressing identifying terminal 22 is unavailable for routing. Neither inter-gatekeeper communication nor directory services are able to solve this application layer routing problem.

Inter-gatekeeper communication and directory services can only resolve a layer 7 destination address into a layer 3 address of a gateway to the layer 7 domain (e.g. the PSTN). Therefore, the layer 7 address, which is the actual desired destination, becomes irrelevant to the IP network routing which takes place. For instance, a layer 7 directory may have multiple entries for a given destination address, where each entry may include a gateway protocol type or gateway cost. However, directories are not dynamic enough to store current status information for the gateway represented by each entry.

For example, there may be two gateways, a primary and a secondary, available to reach the 408 area code through the internet. If the primary gateway is out of service, then 408 area code is still physically accessible. However, once the directory resolves the layer 7/PSTN destination address to the layer 3 address of the primary gateway, then the IP network routes only on the basis of the layer 3 address and not the layer 7 destination. All the IP network knows is that it can't reach the layer 3 address of the first gateway. Once the layer 3 address is obtained from the static directory table and the call is sent out into the multiple ISP network, the call will be dependent upon the availability of the layer 3 address.

Similarly, there can be multiple ISPs with gateways to a layer 7 domain, such as the PSTN, where some gateways are better than others. For example, a gateway to the 408* area code from an ISP in San Jose will likely be cheaper in terms of telephony costs than a gateway to the 408* area code from an ISP in Oakland, even though the Oakland ISP may require fewer IP hops and therefore be cheaper in terms of IP network costs.

Therefore, the need remains for an inter-domain application-layer routing protocol that handles multi-hop inter-ISP calls.

FIG. 5 shows an example of a call routed through a voice gateway 516. In order for the H.323 terminal 522 to be able to call a telephone 512 on PSTN 510, the gatekeeper 534 routes the call to the appropriate gateway 516 given the telephone number of the call. However, there are likely to multiple gateways to the PSTN 510 through which the call could route. The PSTN access costs, i.e. phone charges, are likely to be lower through some gateways than others. However, the call from the H.323 terminal 522 to gateway 516 will be routed by the internet 530 based upon the lowest internet cost, irrespective of the telephony costs involved in using a particular gateway.

A static routing table of the conventional art can be modified to reflect the PSTN access costs of the various available gateways and choose the one with the lowest cost. Then the internet 530 will route to that gateway using BGP based upon the least number of hops. However, the static routing table solution is unable to cope with a failure of gateway 516 when other gateways to the same destination phone number are still available. The system will then drop the call when it is unable to reach gateway 516. In addition, the static routing table will also typically require a high degree of manual configuration to set up and maintain the available routes in a large network.

In contrast, the present invention is able to route the call through the IP network to the appropriate gateway according to an aggregate cost function of both the layer 7 gateway cost and the IP network costs. Some possible cost functions are: minimize the total number of hops, minimize the distance traversed in the layer 7/PSTN domain, minimize the distance traversed in the IP data network, or minimize the monetary cost of the call. To make the appropriate call routing decision, each gatekeeper also needs sufficient status information about the reachability of E.164 prefixes in the PSTN. The PSTN call leg, between the gateway and the telephone, is treated no differently from the call legs within the data network.

Therefore, the need remains for a routing system which is self-configuring, routes based upon an aggregate cost of the call, and which maintains current status information regarding each route to the destination.

Typically, the only addressing format PSTN telephones understand is E.164 numbers. Therefore, in order for the PSTN telephone 512 to be able to call the H.323 terminal 522 through the voice gateway, the H.323 terminal 522 must have an E.164 number assigned to it. And the gateway 516, or the gatekeeper 534, must be able to route the call to the H.323 terminal 522 through the IP network 530 based on the H.323 terminal's E.164 number.

FIG. 6 shows how a call can be established from a PSTN telephone 512, through voice gateway 516, onto the IP network 630, then through another voice gateway 626, back to PSTN 620 and eventually to the called telephone 622. Here once the call hops onto the IP network 630, the gateway 516, or the gatekeeper 634, must decide which hop off gateway to route the call to. This decision is made based on the called E.164 number. Note that Cisco's voice gateways can be configured to operate without gatekeepers, and in this case will have to make the call routing decisions on their own. Remember also that the IP cloud 630 of FIG. 6 can be decomposed into multiple ISP networks similar to those in FIG. 4, and therefore the call leg across the IP network 630 may actually consist of multiple hops.

FIG. 7 shows a voice call between two H.323 terminals through PSTN 730. The problem here is to provide gatekeeper 714, or gateway 716, of the calling terminal's IP network 710 with call routing information about the called EP network 720. This is possible if the two IP networks 710 and 720 are connected because they are both part of the overall Internet. As far as the IP network as a whole is concerned, the PSTN cloud 730 will be represented as just a link between two IP nodes, e.g. gateways 716 and 726. FIG. 8 shows a similar topology to FIG. 7, wherein one of the H.323 terminals 722 is replaced with a LAN PBX 828 and telephone 822.

The SIP Architecture

The Session Initiation Protocol (SIP) is an Internet Conferencing Protocol being developed in the IETF. SIP is a signaling protocol for establishing connections between endpoints participating in a conference call. The endpoints advertise their capabilities and media channel information to other nodes in the network using the Session Description Protocol (SDP) format. These capabilities are included in the SIP connection establishment messages. RTP is used for carrying the actual media streams.

The main components involved in SIP conferencing are:
Terminal: a SIP entity capable of creating media streams and of participating in SIP conferences.
Proxy Server: receives SIP requests from a client and creates the corresponding requests for the next call leg of a SIP call.
Redirect Server: receives SIP requests from a client and responds with addressing information about where the call should be forwarded.
Gateway: for example, a gateway from SIP to PSTN, from SIP to H.323.

Example Topologies

FIG. 9 shows an example of a simple SIP call through an architecture 900 which includes proxy server 934. The caller, Terminal 912, sends a SIP request to the proxy server 934. The proxy server 934 forwards the request to the called, Terminal 922. Similarly, a SIP response from Terminal 922 goes through the proxy server 934. However, the media streams flow directly between the two endpoints 912 and 922 through Internet 930.

FIG. 10 illustrates another example of a SIP call in an architecture 1000 wherein Internet 930 is composed of multiple ISP networks 1030, 1040 and 1050. In FIG. 10, the signaling between the two SIP terminals 1012 and 1022 flows through multiple proxy servers 1014, 1034, 1044, 1054 and 1024, thus segmenting the call into multiple call legs. The SIP specification does not describe how to achieve such a multihop scenario. The need remains for a call-routing protocol for routing SIP calls through multiple call legs.

FIG. 11 shows an example of a voice call in an architecture 1100 which includes an SIP/PSTN gateway 1116. The call originates from a PSTN telephone 1112 in PSTN 1110, connects to SIP/PSTN voice gateway 1116 which routes the call through Internet 1130 to a SIP terminal 1122. The same call routing issues apply to this scenario as were discussed above with regard to FIG. 5 for calls between a PSTN telephone and an H.323 terminal.

FIG. 12 shows an example of a toll bypass call in an architecture 1200 involving two voice gateways 1116 and 1226. The call between two PSTN telephones 1112 and 1222 hops of PSTN 1110 onto the IP network 1130 through gateway 1116 and back onto the PSTN 1220 through gateway 1226. The PSTNs 1110 and 1220 are different parts of the overall PSTN, but the call has bypassed long-distance toll charges by passing from one local zone 1110 of the PSTN through the IP network 1130 to another local zone 1220 of the PSTN. In this case SIP is the protocol used to carry the call through the IP network 1130.

FIG. 13 shows another scenario where translation from SIP to H.323 is needed. The architecture 1300 of FIG. 13 includes an SIP/H.323 gateway 1326 which can convert SIP protocol calls received from gateway 1116 over IP network 1130 into H.323 protocol calls which are routed over intranet 1320 to H.323 terminal 1322. SIP/H.323 gateway also converts H.323 calls received over intranet 1320 into SIP for transmission over internet 1130 to gateway 1116. The need remains for a mechanism to keep track of which signaling protocol should be used on a particular segment of the IP networks.

Phases of an IP Telephony Call

An EP Telephony call can be divided into the following phases:
1. Address Resolution: given partial information about the destination of the call, use directory services to obtain complete information about the destination.
2. Call Method: select which application is appropriate to connect to the call destination, e.g. H.323 or SIP.
3. Route Selection: find the best path for routing the call towards its destination.
4. Call Signaling: for connection establishment and capability negotiation between the caller and the called.
5. Media Streams: The actual flow of audio, video, and data, or any combination thereof between the caller and the called.

Note the difference between addressing for IP routing and call routing. IP routing is a network layer/layer 3 function. Call routing, on the other hand is an application layer/layer 7 function. In call routing, a single application level hop may consist of multiple IP level hops.

Accordingly, a need remains for an improved call routing method in internet telephony systems.

SUMMARY OF THE INVENTION

An embodiment of a routing node, according to the present invention, configured to be connected to a network, is composed of a memory configured to store a routing table and a call routing processor configured to receive a routing update message from other routing nodes of the network. The routing update message includes (a network address for an adjacent entity in the network, a range of addresses which the adjacent entity can access, and a cost value for access to the range of addresses through the adjacent entity). Responsive to receiving the routing update message, the call routing processor is configured to insert an entry in the routing table of the memory that associates (the network address for an adjacent entity in the network, the range of addresses which the adjacent entity can access, and the cost value for access to the range of application addresses through the adjacent entity). The call routing processor then modifies the routing update message such that the modified routing update message includes (a network address for the routing node, the range of addresses which the adjacent entity can access, and an incremented cost value obtained by incrementing the cost value received in the routing update message). Then, the call routing processor forwards the modified routing update message to all adjacent entities.

In another embodiment of the present invention, the call routing processor is further configured to receive a call having a destination address. Responsive to receiving the call, the call routing processor is configured to search its routing table for entries where the destination address of the call matches (the range of addresses which the adjacent entity can access), select one of the entries having the lowest cost value, and route the call to (the network address for an adjacent entity in the network) of the selected entry.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 5 is a functional block diagram illustrating an example of an Internet Telephony call from a PSTN terminal through a voice gateway.

FIG. 6 is a functional block diagram illustrating an example of an Internet Telephony call from a PSTN terminal through a voice gateway from the PSTN to the IP network, through another voice gateway from the IP network to the PSTN and terminating on another PSTN terminal.

FIG. 9 is a functional block diagram illustrating an example of an Internet Telephony call from an SIP terminal through the EP network to another SIP terminal wherein a SIP proxy server controls routing of the call.

FIG. 10 is a functional block diagram illustrating an example of an Internet Telephony call from an SIP terminal through an IP network composed of multiple ISPs to another SIP terminal wherein a series of SIP proxy servers control routing of the call.

FIG. 14 is a functional block diagram illustrating an example of routing according to the present invention, in a network having H.323 proxies and an H.323/PSTN gateway.

FIG. 15 is functional block diagram illustrating a network topology where gatekeepers are added to the network topology of FIG. 14.

FIG. 16 is a functional block diagram illustrating an example of routing according to the present invention, in a network having SIP proxies and an SIP/PSTN gateway.

FIG. 17 is functional block diagram illustrating a network topology where gatekeepers are added to the network topology of FIG. 16.

DETAILED DESCRIPTION OF THE INVENTION

Figure 1:
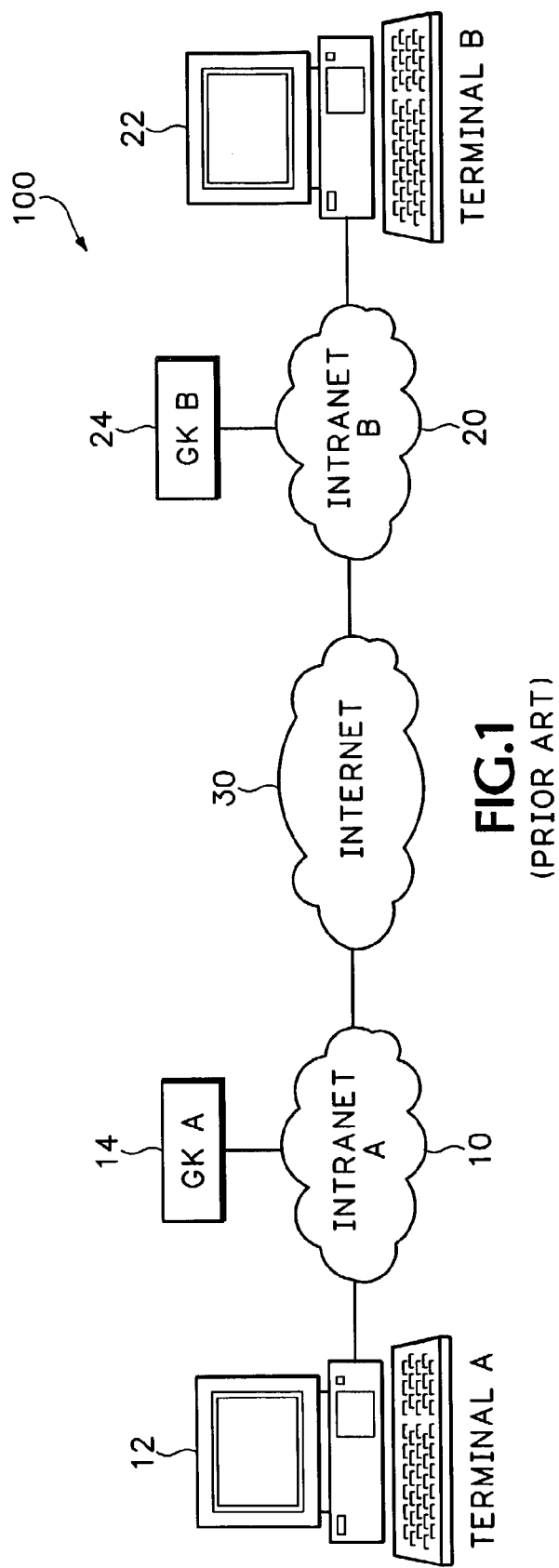
FIG. 1 is a functional block diagram illustrating an example of an Internet Telephony call in a simplified conventional network architecture.
Figure 2:
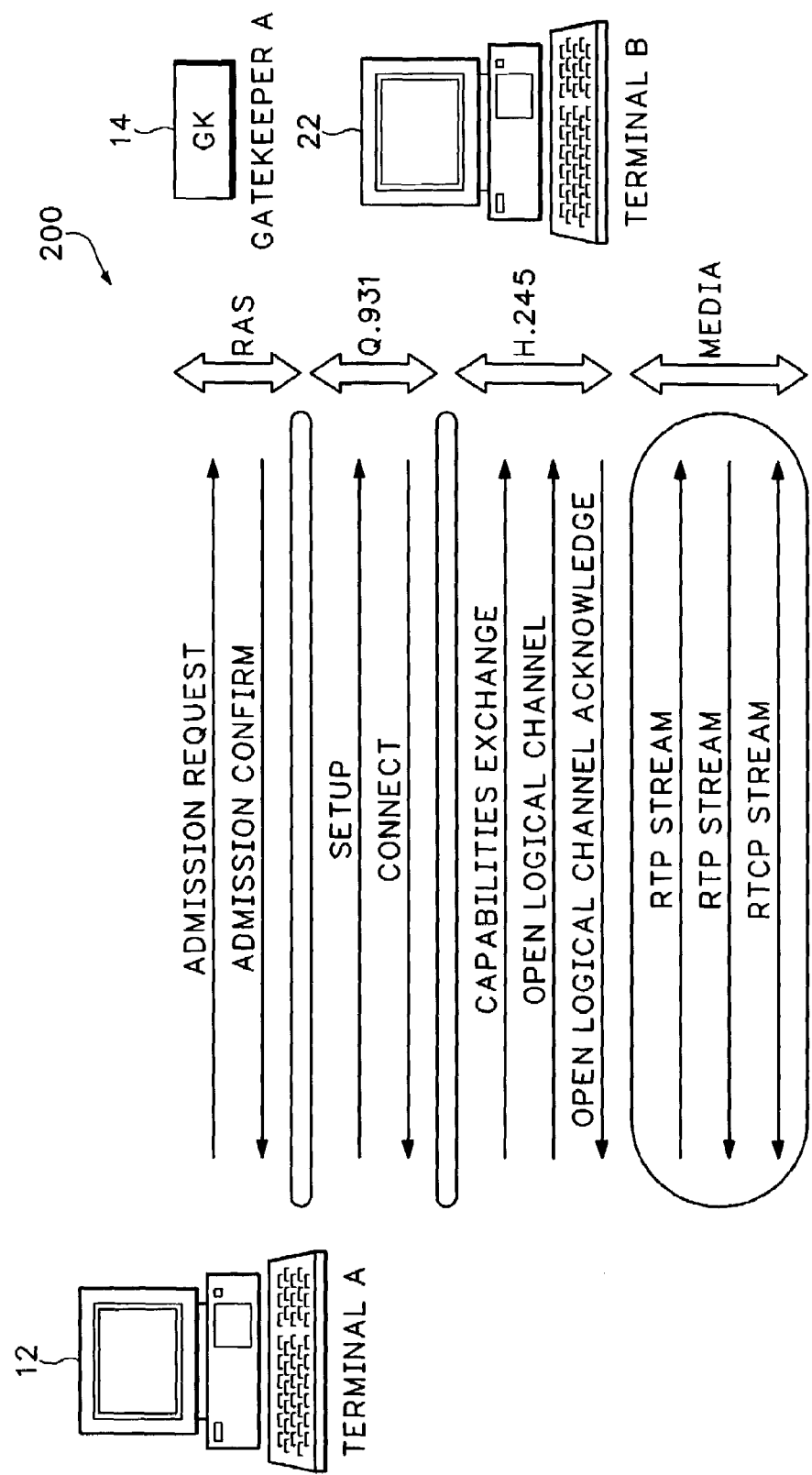
FIG. 2 illustrates an example of H.323 call set-up in the network of FIG. 1.
Figure 3:
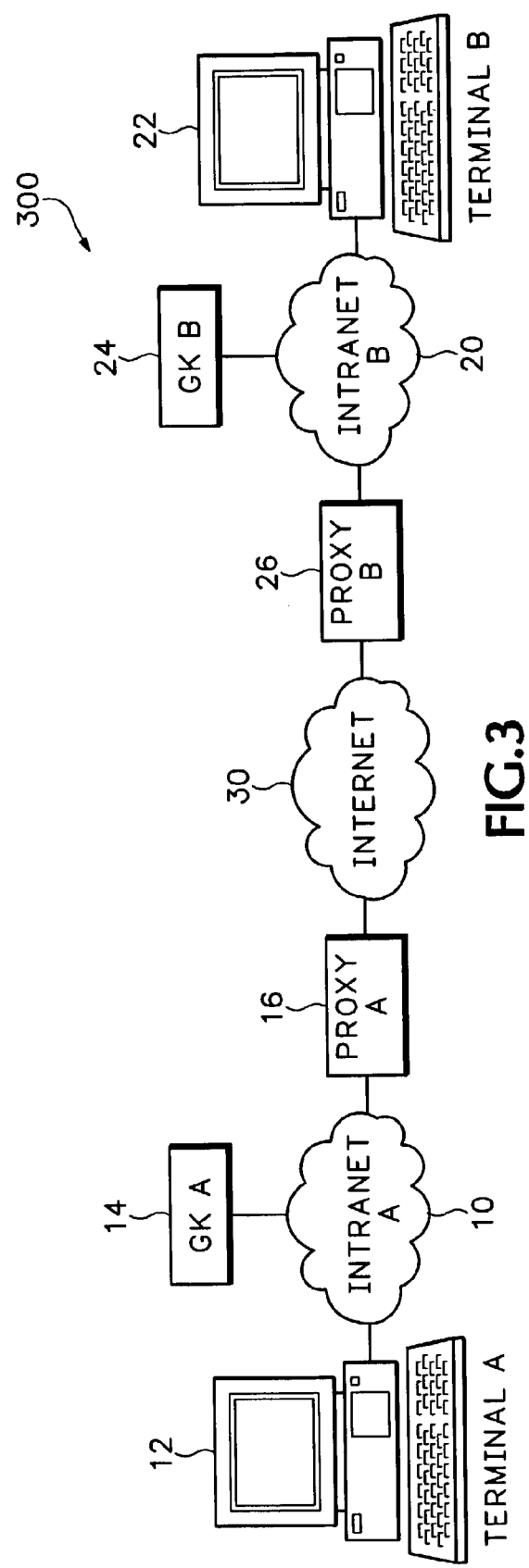
FIG. 3 is a functional block diagram illustrating an example of an Internet Telephony call in another embodiment of a conventional network architecture which includes proxies which isolate the intranets of FIG. 1 from the EP network.
Figure 4:
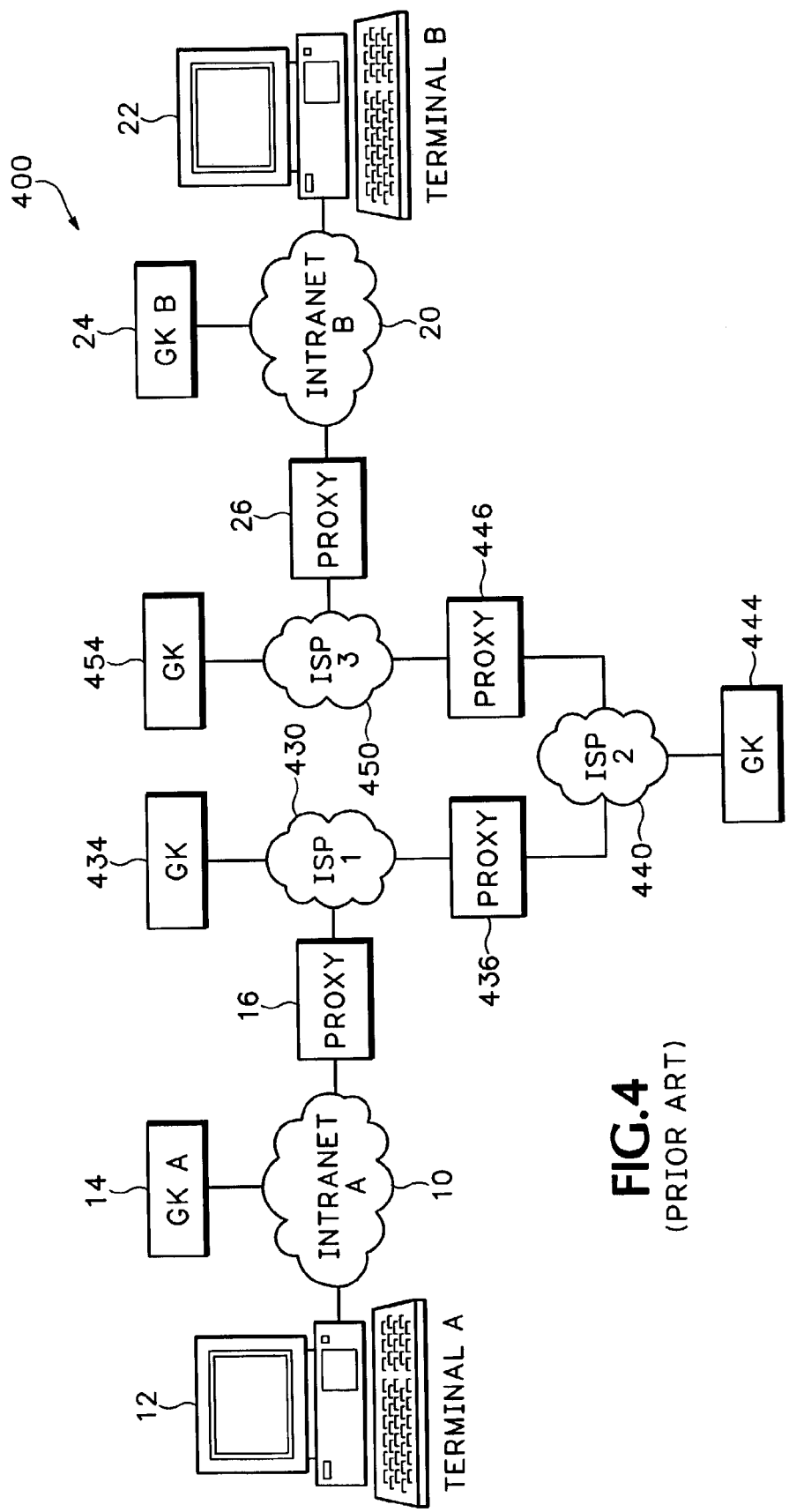
FIG. 4 is a functional block diagram illustrating an example of an Internet Telephony call in another embodiment of a conventional network architecture wherein the IP network includes multiple ISPs.

The present invention is directed to the Call Route phase of an IP telephony call discussed above. Given a valid IP telephony destination address, the present invention is directed towards a mechanism for selecting the best path towards the destination address. The destination address may be a PSTN phone, an IP phone, or any other voice terminal, e.g. an ISDN phone. An embodiment of the call-routing protocol according to the present invention includes the following properties:

Advertises the accessibility of IP telephony addresses and the costs associated with access to the destinations available through each route.

Selects the best route towards a particular IP telephony destination based upon the costs associated with the alternative routes. Only the selected route is further advertised.

Works well within a single service provider network, as well as for inter-service provider call routing.

Is independent of any specific Internet Telephony signaling protocol (H.323, SIP, . . . , etc).

The Border Gateway Protocol (BGP) is the mechanism by which conventional WP networks perform data routing. BGP provides a reliable mechanism for exchanging IPv4 routing information between autonomous systems (ASs) on the backbone of the Internet. The multi-protocol extensions of BGP enable BGP to carry routing information using addressing formats other than IPv4, e.g. E.164 numbers. In addition, BGP permits vendors to define vendor-specific attributes. The present invention makes use of the extensions to BGP for the purposes of call routing.

BGP Overview

BGP is an inter-domain routing protocol for backbone IP networks that make up the larger Internet. The following is a list of some of BGP's important features:

BGP speakers do not discover each other. The network administrator for each ISP has to manually configure a neighborhood relationship between two routers before they can exchange BGP updates.

If two BGP neighbors belong to two different ASes, such as different ISPs, then the protocol running between them is Exterior BGP or EBGP. EBGP is a full-fledged routing protocol. EBGP neighbors must be adjacent to each other, otherwise a tunnel has to be configured between the two neighbors.

If two BGP neighbors are in the same AS, then the protocol running between them is Interior BGP or IBGP. IBGP is not a complete routing protocol, it is there only to tunnel BGP information from one border router, across the AS, to a border router on the other side of the AS. For IBGP to work as a full-fledged interior routing protocol, a full mesh neighborhood relationship has to be configured between all BGP speakers inside the autonomous system.

For BGP, the path from one AS to another AS represents a single hop. So the hop count along a path is the number of ASes traversed along that path. The BGP next hop is in the next AS towards the destination and not necessarily physically connected to the current router.

BGP promotes hierarchical address assignment. This simplifies route aggregation and hence results in significant reduction in the size of routing tables.

BGP uses multiple metrics to decide which routes to use and to propagate. The number of ASes traversed to reach the destination network is an important metric in that decision.

BGP provides mechanisms to guarantee loop-free advertisement of routes

Multiprotocol extension attributes are optional and non-transitive. This means that a BGP speaker who doesn't support the multiprotocol extensions will simply drop these attributes.

The present invention extends many of the properties of BGP to call routing of application layer or layer 7 addresses. Some of the properties of BGP are reliability, scalability, quick convergence, and the ability to do multi-hop call routing. In contrast, conventional Internet telephony call routing typically just selects the hop off gateway for the call.

IP Telephony Address Formats

IP telephony can potentially use a number of different methods for naming and addressing endpoints. One of these is the PSTN method of using E.164 numbers. Therefore, if IP telephony is to inter-operate with the PSTN, it has to support E.164 numbers. E.164 numbers are decimal numbers and they exhibit a nice hierarchy that may be very useful for aggregation. However, different aggregation methods than those currently used for aggregating binary IP addresses are required. The present invention uses a wildcard prefix method similar to address prefixes used for HP routing. Extensions to the present invention allow for other aggregation techniques, such as address ranges.

Another addressing format used in IP telephony is domain names, e.g. eos.ncsu.edu. These support some degree of aggregation along the domain hierarchy boundaries. The present invention supports this form of addressing as well.

Layer 3 IP addresses can also be used to identify IP telephony equipment. Aggregating binary IP addresses using Classless Inter-Domain Routing (CIDR) is relatively straightforward. For example, in classful addressing, IP addresses are divided into class A, class B, and class C. For class A the prefix length is 8 bits, for class B it is 16 bits, and for class C it is 24 bits. You can't have a 21 bit prefix with classful addressing. With CIDR the prefix can be of any length <=32 bits (i.e. the size of the IP address).

It is important not to confuse the traditional use of IP addresses for network layer or layer 3 routing with the use of IP addresses for application layer/layer 7 routing in the present invention. We will call the layer 7 addresses used for call routing L7IP addresses. L7IP addresses have the same format as traditional layer 3 IP addresses, and the L7IP address of an endpoint will, most probably, have the same value as the layer 3 IP address of that endpoint. However, the L7HIP address has a different meaning and is used in a different context than the layer 3 address.

The present invention supports all three formats mentioned above by utilizing BGP address families.

Using BGP for Call Routing

An embodiment of the present invention will be referred to as Telephony BGP. The multiprotocol extensions for BGP can be used to define attributes to carry routing information in different formats. E.164 numbers and L7IP (same as IPv4 addresses) addresses are among the defined formats. The multiprotocol extensions for BGP define the following fields for advertising a reachable route:

the address family identifier network address of the next hop a list of reachable prefixes via that next hop Note that the IP network address of the next hop is a network layer/layer 3 address while the reachable PSTN/application prefixes are application layer/layer 7 addresses.

Next Hop

The entity at the next hop depends on what IP telephony protocol is being used and what mode this protocol is being used in. For example, one AS may wish to advertise an H.323 proxy (to be contacted using Q.931) as the next hop. Another AS may wish to advertise a gatekeeper (to be contacted using RAS) as the next hop. An AS that supports SIP may wish to specify a SIP proxy server as the next hop. In addition, an AS may wish to advertise the availability of multiple next hops.

For example, if an AS includes an H.323 proxy and a SIP proxy, then the AS is capable of handling both types of applications.

In addition, it is also advantageous to advertise the next hop protocol in addition to the next hop network address as will become evident from the examples below. Possible choices for the next hop protocol include: SIP, Q.931, and RAS (other protocols may be appended to this list in the future, if Telephony BGP is to support other Internet telephony, conferencing, or streaming protocols, e.g., RTSP). RAS is included in this list even though it is not a call signaling protocol, because RAS messages can be routed multi-hop between gatekeepers and can be used to obtain information necessary for setting up multi-hop calls.

An embodiment of a simplified network topology 1400, operating according to the present invention, is shown in FIG. 14. In the topology 1400, ASes 1430, 1440, 1450 and 1460 represent a portion of the larger Internet from which Internet Telephony calls can be received. AS 1430 includes an H.323 proxy (PX1) 1434 and is connected to AS 1440. AS 1430 is further connected to the Internet from which it can receive H.323 protocol calls. AS 1440 includes an H.323 proxy (PX2) 1446 and is further connected to AS 1450. AS 1450 includes an H.323 proxy (PX3) 1458 and is further connected to AS 1460. AS 1460 includes an H.323/PSTN gateway (GW) 1462 which provides access to PSTN addresses with the prefix 408*.

In FIG. 14, PX1 1434 receives an H.323 call for "4085277147". PX1 1434 speaks Telephony BGP and it has the following call routing entry in its call routing table:

| Destination | List of (Next Hop Network Address, Next Hop Protocol) |
|---|---|
| E.164: 408* | {(address of PX2, Q.931)} |

PX1 1434 establishes a call leg with PX2 1446 which has the following call routing entry for E.164 prefix "408*":

| Destination | List of (Next Hop Network Address, Next Hop Protocol) |
|---|---|
| E.164: 408* | {(address of PX3, Q.931)} |

Thus PX2 connects the call to PX3. PX3's call routing table entry for E. 164 prefix "408*" is:

| Destination | List of (Next Hop Network Address, Next Hop Protocol) |
|---|---|
| E.164: 408* | {(address of GW, Q.931)} |

Therefore PX3 1458 connects to GW 1462 which forwards the call to PSTN.

In FIG. 15, the topology of FIG. 14 is expanded to form topology 1500 which includes gatekeepers (GKs). ASes 1430, 1440, 1450 and 1460 include gatekeepers 1436, 1444, 1454 and 1464, respectively.

In topology 1500, the gatekeepers speak TBGP, but the proxies and gateways do not. PX1 1434 is registered with GK1 1436, PX2 1446 is registered with GK2 1444, PX3 1458 is registered with GK3 1454, and GW 1462 is registered with GK4 1464. When a call to "4085277147" arrives at PX1, it queries its gatekeeper, GK1, where to forward the call next. GKT speaks Telephony BGP and has the following call routing entry:

| Destination | List of (Next Hop Network Address, Next Hop Protocol) |
|---|---|
| E.164: 408* | {(address of GK2, RAS)} |

GK1 sends an RAS query to GK2 asking where to next forward the call. GK2's answer to GK1 is to forward the call to PX2. Therefore, GK1 instructs PX1 to establish a call leg with PX2. When PX2 receives the call the same procedure is repeated. In this case, GK2 has the following call routing entry:

| Destination | List of (Next Hop Network Address, Next Hop Protocol) |
|---|---|
| E.164: 408* | {(address of GK3, RAS)} |

The next hop after PX2 will be PX3 and the following hop will be GW 1462 where the call hops off to the PSTN. The call routing entry at GK3 is:

| Destination | List of (Next Hop Network Address, Next Hop Protocol) |
|---|---|
| E.164: 408* | {(address of GK4, RAS)} |

GK4 is configured to forward all H.323 calls addressed to area code "408*" to GW 1462. Alternatively GW 1462 can inform GK4 that it is capable of reaching area code "408*" which will cause GK4 to automatically configure the rest of the network using the TBGP of the present invention.

The example of FIG. 16 is similar to that of FIG. 14 except that PX1 1634 operates using SIP instead of the H.323 protocol of PX1 1434. Therefore SIP replaces Q.931 in all the call routing entries and an SIP call received by PX1 1634 will route through topology 1600 in the same manner as the H.323 call received by PX1 1434 in FIG. 14. For example, the call routing entry at PX1 1634 will be:

| Destination | List of (Next Hop Network Address, Next Hop Protocol) |
|---|---|
| E.164: 408* | {(address of PX2, SIP)} |

Topology 1700 in FIG. 17 combines some of the features of topologies 1500 and 1600 and therefore includes both H.323 and SIP protocol proxies along with gatekeepers. AS 1740 includes PX2 1446 which operates using H.323 and SIP/H.323 gateway 1748 which converts messages between H.323 and SIP formats.

In FIG. 17, the call routing progresses the same as in the example of FIG. 15 until the call reaches PX2 1446. PX2 1446 queries its gatekeeper GK2 1444 regarding where to next forward the call. GK2 1444 has the following routing entry:

| Destination | List of (Next Hop Network Address, Next Hop Protocol) |
|---|---|
| E.164: 408* | {(address of PX3, SIP)} |

Since the incoming call at PX2 is an H.323 call and the only routes available utilize SIP proxies, the call must be translated to SIP before it can be forwarded to the next hop PX3 SIP proxy 1658. Therefore GK2 instructs PX2 to forward the call to the H.323/SIP gateway GW1 1748 for translation. Assuming that GW1 is registered with GK2 1444 and that it is not a Telephony BGP speaker, GW 11748 queries GK2 1444 where to next forward the call, and GK2 instructs GW1 to forward the call to PX3 1658.

PX3 1658 receives the call which is now in SIP format. PX3 speaks Telephony BGP and has the following call routing entry:

| Destination | List of (Next Hop Network Address, Next Hop Protocol) |
|---|---|
| E.164: 408* | {(address of GW2, SIP)} |

PX3 1658 establishes a call leg to GW2 1662 where the call hops off to the PSTN.

Figure 18:
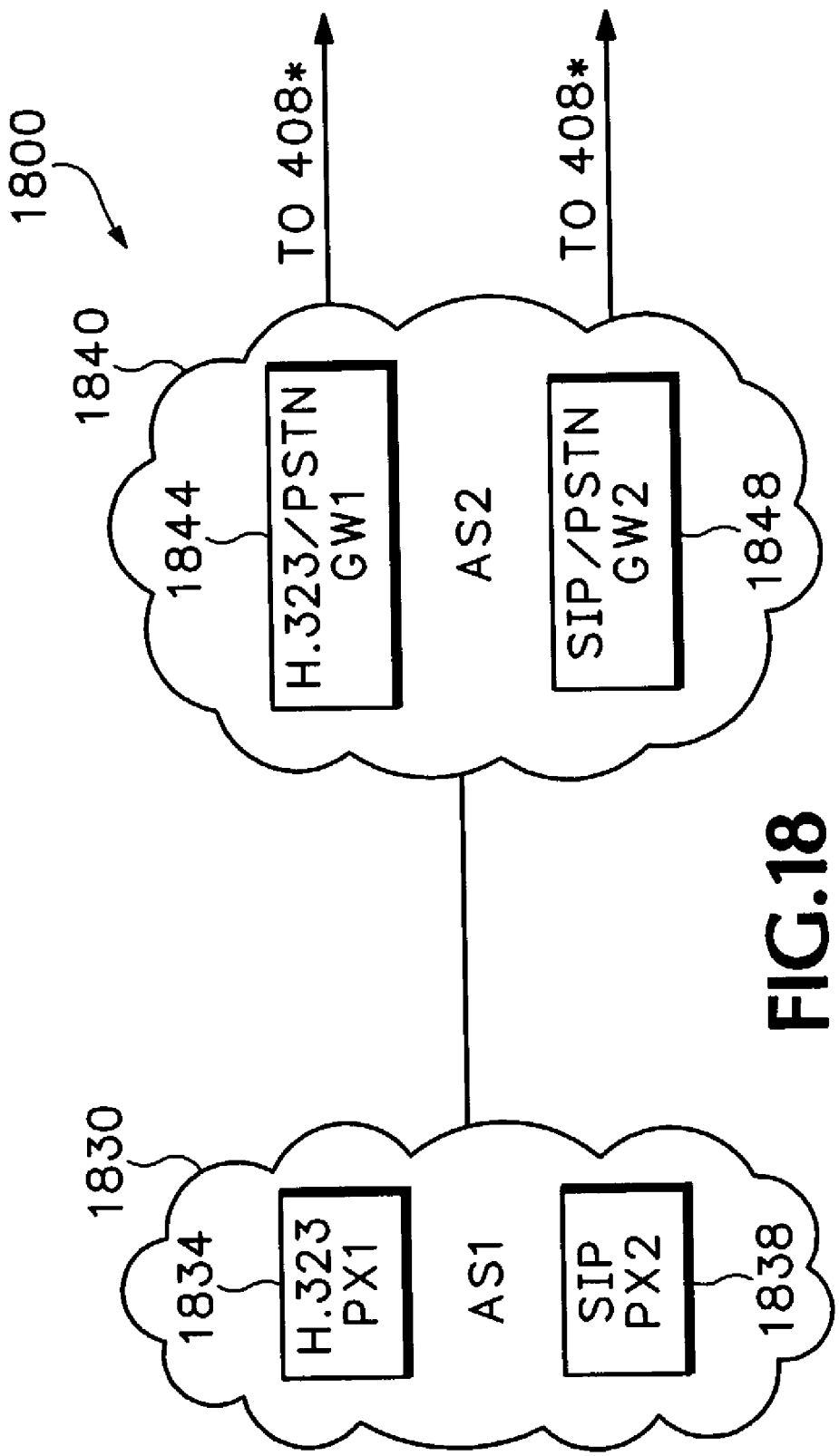
FIG. 18 is a functional block diagram illustrating an example of route advertising according to the present invention, in a network having both an H.323/PSTN gateway and an SIP/PSTN gateway.

It is possible for there to be different destinations for a call within an AS based upon the protocol of the call. An AS having different next hops depending on which signaling protocol is being used can advertise this fact to the other ASes. In topology 1800 of FIG. 18, AS2 1840 has both a SIP/PSTN gateway 1844 (GW1) and an H.323/PSTN gateway 1848 (GW2), both of which can reach the E.164 prefix "408*". A TBGP device in AS2 will advertise the capability of GW1 and GW2 to its peers. AS1 1830 includes both H.323 proxy PX1 1834 and SIP proxy PX2 1838. If either proxy PX1 or PX2 is a TBGP speaker, then it will receive an advertisement from the TBGP device in AS2 1840 and will, as a result, create a call routing entry of the form:

| Destination | List of (Next Hop Network Address, Next Hop Protocol) |
|---|---|
| E.164: 408* | {(address of GW1, Q.931), (address of GW2, SIP)} |

As demonstrated above, the next hop attribute can be a list of several possible next hops.

Gateways, and even proxies, have limited resources and multiple gateways may be used to allow more concurrent calls towards the same set of destination addresses. For example, in FIG. 18, GW2 1848 in AS2 1840 may be replaced by three gateways (e.g. GW2, GW3 and GW4) that can all reach 408* destinations. Telephony BGP allows advertising of all three gateways to the other ASes. To achieve this, we replace the next hop network address in the TBGP peers in AS1 1830 with a list of next hop network addresses. With this change, the above call routing entry at will be:

| Destination | List of (List of Next Hop Network Address, Next Hop Protocol) |
|---|---|
| E.164: 408* | {({address of GW1}, Q.931), ({address of GW2, address of GW3, address of GW4}, SIP)} |

Figure 19:
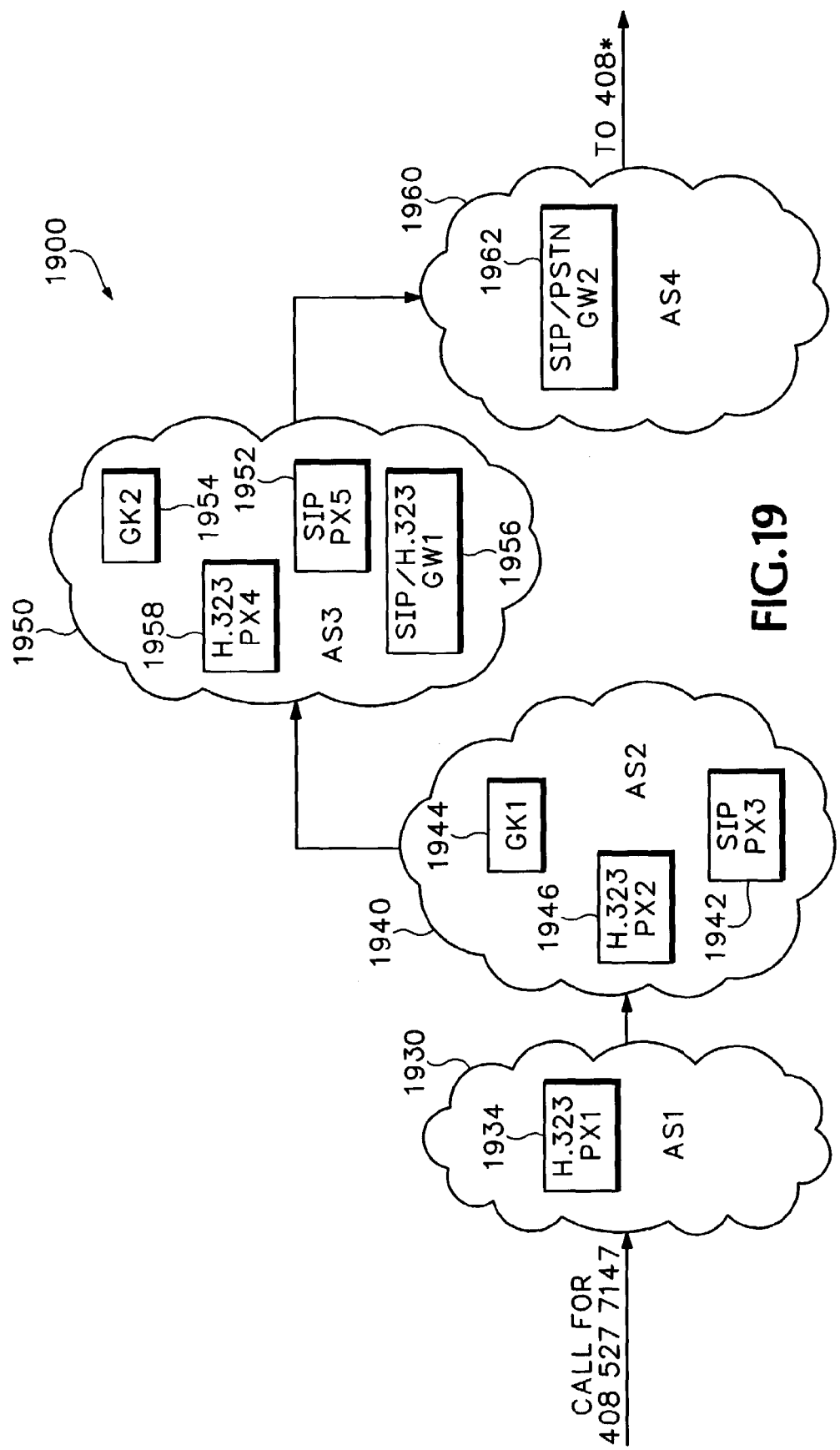
FIG. 19 is a functional block diagram illustrating an example of routing of an Internet Telephony call, in an embodiment of a network according to the present invention, through multiple ISPs to an SIP/PSTN gateway.

FIG. 19 illustrates another embodiment of a network topology 1900, suitable for application of the present invention, that will be used to demonstrate a complex example of advertising of the next hop network address along with the next hop routing protocol.

In the topology 1900, ASes 1930, 1940, 1950 and 1960 represent a portion of the larger Internet from which Internet Telephony calls can be received. AS 1930 includes an H.323 proxy (PX1) 1934 and is connected to AS 1940. AS 1930 is further connected to the Internet from which it can receive H.323 protocol calls. AS 1940 includes an SIP proxy (PX3) 1942, a gatekeeper (GK1) 1944, and an H.323 proxy (PX2) 1946. AS 1940 is further connected to AS 1950. AS 1950 includes an SIP proxy (PX5) 1952, a gatekeeper (GK2) 1954, an SIP/H.323 gateway (GW1) 1956, and an H.323 proxy (PX4) 1958. AS 1950 is further connected to AS 1960. AS 1960 includes an SIP/PSTN gateway (GW2) 1962 which provides access to PSTN addresses with the prefix 408*.

In the example shown in FIG. 19, PX1 receives an H.323 call to layer 7 address "4085277147". PX1 (which works gatekeeperless) speaks Telephony BGP, and has the following call routing entries in its routing table:

| Destination | List of (Next Hop Network Address, Next Hop Protocol) |
|---|---|
| E.164: 408* | {(address of PX2, Q.931), (address of PX3, SIP)} |

PX1 searches it routing table for a match on the layer 7 address, which falls within the E.164:408* prefix, and the protocol of the H.323 call, which is Q.931. PX1 will find the call routing entry in the routing table which associates the E.164: 408* address with (address of PX2, Q.931). Note that the address of PX2 is a network/layer 3 address.

Based upon the Q.931 call routing entry, PX1 forwards the call to PX2 and connects to PX2 using Q.931. PX2 is registered with the gatekeeper of AS2, GK1. GKK1 speaks Telephony BGP, which PX2 does not. PX2 notifies GK1 that it has received a call for "4085277147" and queries GK1 for the next hop to forward the call. GK1 has the following call routing entries in its routing table:

| Destination | List of (Next Hop Network Address, Next Hop Protocol) |
|---|---|
| E.164: 408* | {(address of GK2, RAS), (address of PX5, SIP)} |

Since GK1 speaks RAS but not SIP, it queries GK2, using RAS, on where to forward the call next. GK2 has the following call routing entry:

| Destination | List of (Next Hop Network Address, Next Hop Protocol) |
|---|---|
| E.164: 408* | {(address of GW2, SIP)} |

Since the only possible next hop from AS3 to AS4 uses SIP, the call has to be translated from H.323 to SIP. GK2 responds to GK1's query asking it to forward the call to GW1 (an H.323/SIP gateway). GK1, in turn, responds to PX2's query asking it to forward the call to GW 1. PX2 then connects to GW 1.

Note that GW1 is registered with GK2 in this scenario. GW1 can be configured to register itself automatically using H.323 procedures. Alternatively, it is also possible to manually configure GK2 with information regarding GW1.

Assume GW1 speaks Telephony BGP. It has the same call routing entry as GK2. When GW1 receives the H.323 call, it translates it into SIP and forwards it to GW2. GW2 is configured to forward any calls for the prefix "408" out to the PSTN, and the call is routed to its final destination.

Note that GW1 does not have to be a TBGP speaker. If, for example, GK2 is a TBGP speaker and knows about the existence of GW1, then it will route the calls to it. It is also possible to advertise to adjacent ASes that GW1 is the next hop and that it speaks Q.93 1, but the present invention can also advertise that GK2 is the next hop and that it speaks RAS.

To accommodate the routing described in the above example, the present invention defines a new voice_next hop attribute that has the format:

voice_next_hop=List of (List of Next Hop Network Address, Next Hop Protocol)

Note that if AS1 supports only H.323 and has no H.323/SIP gateways and its neighbor, AS2, supports only SIP and also has no H.323/SIP gateways, then calls will be unable to hop between AS1 and AS2. The network topologies of the ISPs must be engineered to accommodate such hops.

Cost

BGP currently does not define an attribute for representing the cost associated with an advertised path. The attribute closest to a cost metric defined in BGP is the AS_path attribute that counts the number of AS hops on the path to the destination. AS_path is useful for route selection in Telephony BGP, but it only reflects the internet cost and therefore is not a sufficient representation of the cost associated with a voice call. Therefore, the present invention includes a cost attribute as follows:

voice_cost=Integer

Initially, each Telephony BGP gateway, such as gateway GW2 1962 in FIG. 19, advertises its IP telephony route and assigns a non-negative integer value to voice_cost to that route which represents the cost associated with accessing the PSTN through the gateway. The voice_cost is an additive metric, so intermediate Telephony BGP routers will update voice_cost by adding the cost associated with their AS. Thus, voice_cost will represent both the PSTN and internet cost for access to a given layer 7 address through the route associated with the voice_cost. In practice, there can be scenarios where the cost of traversing an IP AS will be set to zero. However, it is hard to imagine scenarios where the cost associated with hopping from a gateway off to the PSTN will be set to zero.

Other cost metrics based on delay and bandwidth availability can be included in the present invention without departing from the spirit of the present invention.

Telephony BGP and Standard BGP

The present invention as embodied in Telephony BGP utilizes many of the functions of that exist in standard BGP. For example:

Telephony BGP uses the state machine defined in standard BGP that is used to create and maintain connections between neighboring entities.

Telephony BGP uses the same four messages already defined by BGP (OPEN, UDPDATE, KEEPALIVE, and NOTIFICATION).

Telephony BGP uses the same mechanisms used by standard BGP to ensure loop-free route advertisement.

However, at run time, Telephony BGP can be separated completely from standard BGP. It may run on a different TCP port than standard BGP. The purposes for separation are:

Separate the processing engine for BGP from that of Telephony BGP. If both standard BGP and Telephony BGP run on the same instance of the protocol then unexpected behaviors can occur when the processing engine receives a single Update message that includes both network layer/layer 3 advertisements and application layer/L7IP advertisements.

By running standard BGP and Telephony BGP on the same TCP port, the present invention would require all BGP speakers to be upgraded to support Telephony BGP. That's not practical. Note that a BGP speaker drops attributes which it does not understand.

Permit standard BGP and Telephony BGP to define the boundaries of their ASes differently.

Injecting Routes into Telephony BGP, the Telephony BGP API, and the Telephony BGP CLI Routes can be injected into the call routing protocol of the present invention at any Telephony BGP speaker/routing agent. The routing agent can be an H.323 gatekeeper, gateway, or proxy, or a SIP proxy server or gateway to PSTN. Injected routes represent segments and components of the network that are not under the control of Telephony BGP. For example, an H.323/PSTN gateway that speaks Telephony BGP may inject routing entries for the E.164 prefixes that it can reach on the PSTN side. Each injected entry consists of the application layer/L7IP destination prefix and the cost associated with accessing it.

Interior Telephony BGP and Exterior Telephony BGP

Interior Telephony BGP is the protocol that will run between Telephony BGP neighbors belonging to the same AS. Its behavior relative to Exterior Telephony BGP is the same as IBGP's behavior relative to EBGP. Similar to IBGP, Interior Telephony BGP uses the LOCAL_PREF attribute to select between different routes for the same destination learned by different Internal Telephony BGP peers. To avoid creating loops, an Interior Telephony BGP peer does not advertise to other interior Telephony BGP peers routes that are learned via other Interior Telephony BGP peers.

Exterior Telephony BGP is very similar to EBGP, except that, unlike standard EBGP, exterior Telephony BGP neighbors are not required to be adjacent.

In standard BGP, before a BGP speaker advertises a route to an external peer, it updates the attributes in the Update message. For example, it updates the AS_path by prepending its own AS number. It also updates the NEXT_HOP attribute before forwarding the Update message to an EBGP peer. Telephony BGP uses the AS_path attribute in exactly the same fashion as does standard BGP. However, Telephony BGP uses the voice_next_hop attribute instead of the NEXT_HOP attribute. The voice_next_hop attribute has been described above. We will now describe how to update voice_next_hop using the topology 1900 of FIG. 19 in the example of FIG. 20.

Figure 20:
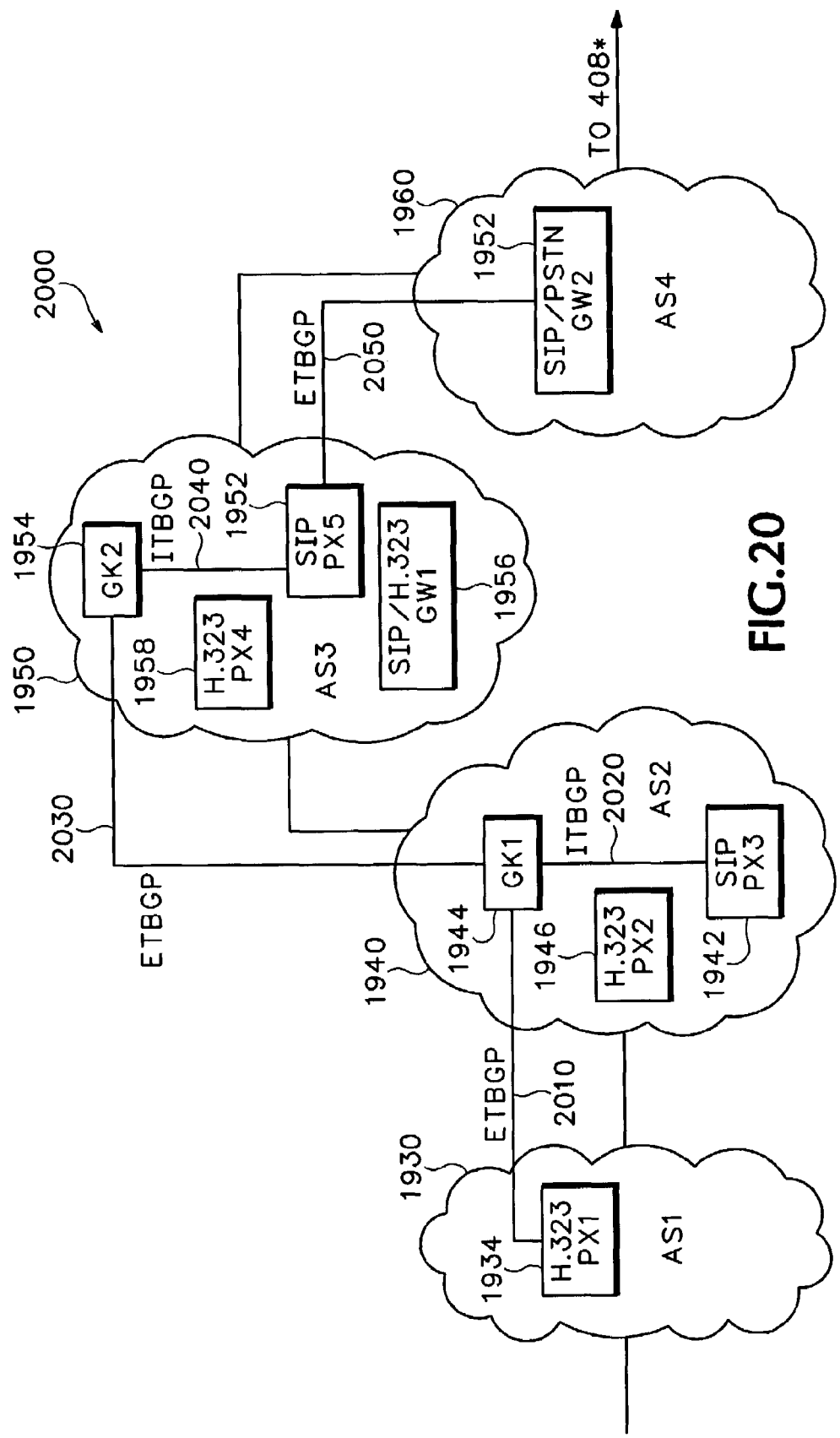
FIG. 20 is a functional block diagram illustrating part of the signaling for the example of FIG. 19.

In the example in FIG. 20, the SIP/PSTN gateway GW2 is configured to route voice calls to PSTN destinations in the "408" area code. GW2 speaks Telephony BGP. A call routing entry is injected into GW2's Telephony BGP for destination prefix E.164"408*". In the example of FIG. 20, GW2 has only one configured neighbor, the SIP proxy server PX5 of AS5. GW2 forwards an Update message 2050 to PX5 with following important information:

Address Family Identifier=E.164
Network Layer Reachability Information=408*
voice_next_hop={({address of GW2}, SIP)}
voice_cost=5
AS_path={AS4}

Note here that the emphasis in this example is on how the present invention, as embodied in Telephony BGP, works for routing PSTN/voice calls. The format shown for the attributes and fields is just one example. Also, Telephony BGP is an embodiment of the present invention which is built upon the framework of standard BGP. The Network Layer Reachability Information attribute is the attribute name used in the multi-protocol extensions to standard BGP and doesn't reflect that the present invention is performing layer 7 routing. Further, a voice_cost value of five is shown for the PSTN call leg from GW2 to area code 408 and a cost of 1 is added for each AS hop.

PX5 receives the Update message 2050 from GW2, creates a corresponding call routing entry in its routing table and forwards the Update message 2040 to its interior Telephony BGP neighbor GK2 without any modifications. Upon receiving the Update message, GK2 creates a corresponding call routing entry in its routing table and then modifies and forwards the Update message 2030 to all routing agents in adjacent ASes. In this case, the only Exterior Telephony BGP neighbor to GK2 is GK1. GK2 modifies the Update message as follows:

Address Family Identifier=E.164
Network Layer Reachability Information=408*
voice_next_hop={({address of GK2}, RAS), ({address of PX5}, SIP)}
voice_cost=6
AS_path={AS3, AS4}

Note that GK2 has incremented the voice_cost value by one and added its own AS, AS3, to the AS-Path list. Also, note that GK1 has inserted its own layer 3/network layer address into the voice_next hop list as being associated with the RAS protocol and inserted the address of PX5 associated with the SIP protocol.

When GK1 receives the Update message from GK2, it creates a call routing entry and forwards the Update message 2020 unmodified to its interior neighbor, PX3. Note here that PX3, a TBGP speaker, is not connected to any peers in other ASes. GK1 also forwards the Update message to its exterior neighbor, PX1, after modifying it as follows:

Address Family Identifier=E.164
Network Layer Reachability Information=408*
voice_next_hop={({address of PX2}, Q.931), ({address of PX3}, SIP)}
voice_cost=7
AS_path={AS2, AS3, AS4}

There will be situations where the Internet Telephony components in an AS will not be interested in terminating a call leg and starting a new call leg for every phone call which traverses that AS (reasons for terminating call legs at intermediate ASes include enforcing security and QoS policies). In such situations, Telephony BGP speaker do not modify the voice_next_hop attribute before forwarding the Update message to the next AS. For the example of FIG. 20, if AS2 does not want to terminate voice calls going to area code 408, then the Update message 2010 going from GK1 to PX1 will include the following information:

Address Family Identifier=E.164
Network Layer Reachability Information=408*
voice_next-hop={({address of GK2}, RAS), ({address of PX5}, SIP)}
voice_cost=7
AS_path={AS2, AS3, AS4}

Route Selection

Below is an embodiment of a call route selection algorithm for use in the Telephony BGP embodiment of the present invention. Where multiple routes to the same destination exist at a given routing agent, Telephony BGP follows the steps below to choose the best route for forwarding voice calls from the routing agent towards the destination of a call:

1. If a next hop entity is inaccessible, then the route associated with the entity is ignored.
2. Prefer the route with the largest local preference (local policy has top priority). The local preference is assigned by the network engineer of the ISP which operates the AS containing the routing agent.
3. If the routes have the same local preference, then prefer the route which has the least value for voice_cost. Note that the voice_cost attribute represents the aggregate cost of all intermediate hops of the ASes making up the IP network as well as the cost for accessing the PSTN at the end gateway.
4. If the voice_cost values are equal, then prefer the route which was locally originated, i.e. a route that has been introduced to the network by the routing agent performing the selection algorithm.
5. If there is still a tie among multiple routes, then prefer the route with the shortest AS_path, i.e. the fewest ASes in the AS_path. AS_path represents the number of AS hops, which is a simple cost metric used as a tie breaker.
6. If there is still a tie, prefer the route with the lowest ORIGIN type. ORIGIN is an attribute set by the BGP speaker that injects the route into BGP. ORIGIN can take one of three values: internal (if the route was manually injected/configured on one of the interior neighbors of this routing agent); external (if the route was learned from an external AS); and incomplete (if the route was learned by redistribution from some interior routing protocol). BGP prefers internal over external over incomplete.
7. If there is still a tie, prefer the route with lowest MED. (MED is a BGP attribute that can be included in a route update message from an AS to its peer AS. TBGP also includes MED. MED is used to select between different routes to the same destination being advertised by the same AS.)
8. If there is still a tie, prefer the route being advertised by the Telephony BGP speaker with the lowest ID. The ID of a Telephony BGP speaker is its IP address. (This is an almost random final tie breaker.)

Note that there is no step in standard BGP that is analogous to Step 3 of the call routing algorithm discussed above. Also note that not all of the steps above need to be incorporated into a route selection algorithm. The selection criterion of Step 3 can be combined with some or all of the other criteria described above to best meet the requirements of the design.

Figure 21:
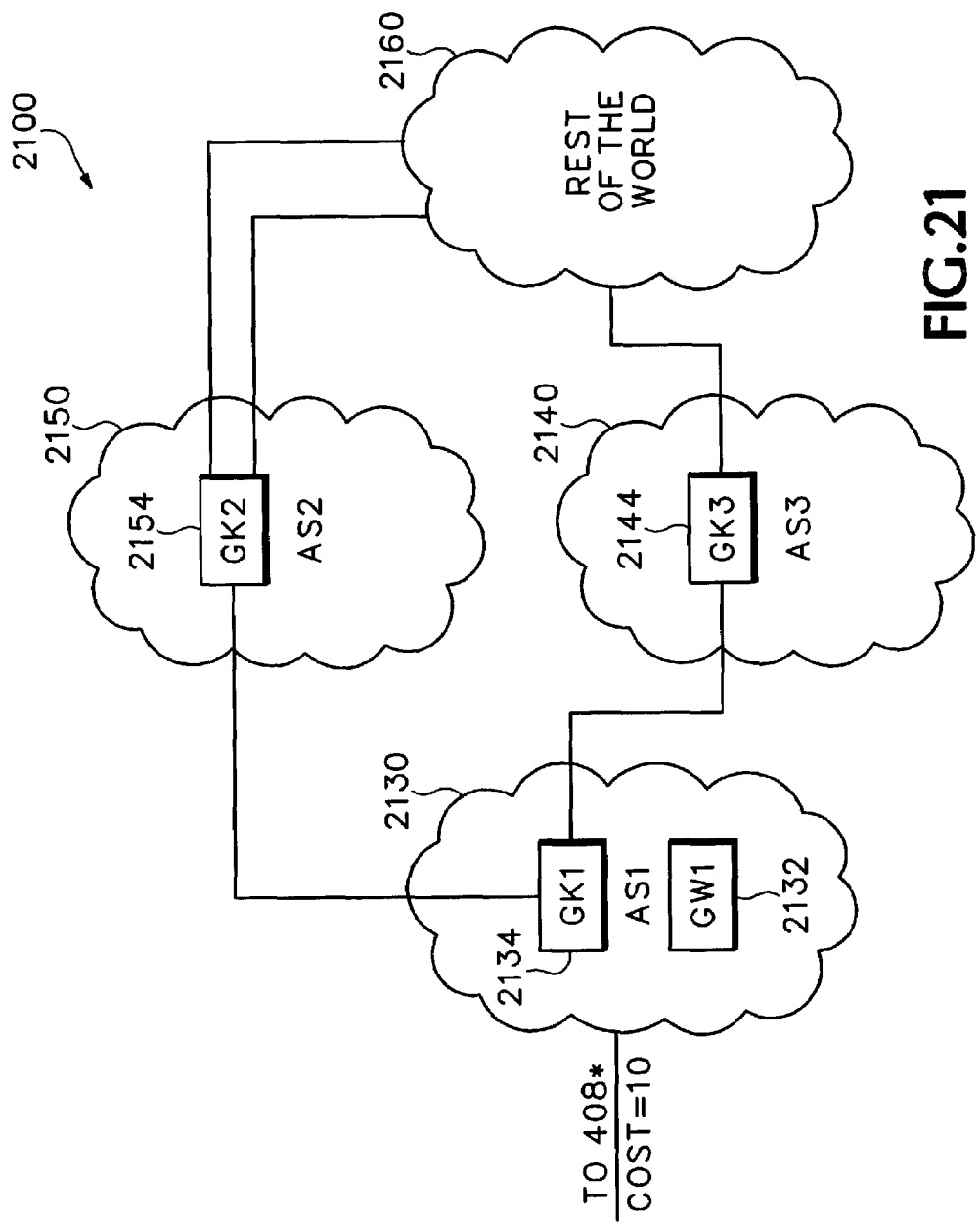
FIG. 21 illustrates a network topology for demonstrating examples of call routing according to the present invention.

The topology 2100 of FIG. 21 will now be used to illustrate the operation of the call routing algorithm for route selection in Telephony BGP. In topology 2100, AS1 2130 includes a gateway 2132 (GW1) which, in the example of FIG. 21, can access area code 408. AS1 also includes gatekeeper 2134 (GK1) which is adjacent to gatekeeper 2144 (GK3) in AS3 2140 and gatekeeper 2154 (GK2) in AS2 2150. AS2 and AS3 are further connected to the larger IP network 2160.

In a first example using FIG. 21, GK1 has the locally originated route through gateway 2132 associated with destination prefix 408, and in addition learns, through routing Update messages from GK2 and GK3, of two external routes associated with destination prefix 408. The three routes can be summarized as follows:

|  | Local route | Route from GK2 | Route from GK3 |
|---|---|---|---|
| voice_next_hop | {({address of GW1}, Q.931)} | {({address of GK2}, RAS)} | {({address of GK3}, RAS)} |
| voice_cost | 10 | 5 | 15 |
| AS_path | { } | {AS2, AS4, AS6} | {AS3, AS5} |
| Local preference | 100 | 100 | 200 |

Note that the Local preference value for routes learned from GK2 and GK3 in this example are manually preconfigured on GK1.

Assume for purposes of the example that Step 1 of the route selection is always satisfied (i.e. the next hop routing agents are reachable). Step 2 is to compare the local preferences of the three routes, and the route learned from GK3 is preferred because it has the largest local 10 preference. However, for a second example using FIG. 21, the configured local preference for routes learned from GK3 changes as follows:

|  | Local route | Route from GK2 | Route from GK3 |
|---|---|---|---|
| voice_next_hop | {({address of GW1}, Q.931)} | {({address of GK2}, RAS)} | {({address of GK3}, RAS)} |
| voice_cost | 10 | 5 | 15 |
| AS_path | { } | {AS2, AS4, AS6} | {AS3, AS5} |
| Local preference | 100 | 100 | 50 |

In this second example, the route from GK3 will be eliminated in Step 2, and the route from GK2 will preferred over the local route in Step 3 because it has lower voice_cost value.

Now consider a third example wherein the voice_cost advertised by GK2 changes as follows:

|  | Local route | Route from GK2 | Route from GK3 |
|---|---|---|---|
| voice_next_hop | {({address of GW1}, Q.931)} | {({address of GK2}, RAS)} | {({address of GK3}, RAS)} |
| voice_cost | 10 | 10 | 15 |
| AS_path | { } | {AS2, AS4, AS6} | {AS3, AS5} |
| Local preference | 100 | 100 | 50 |

In this case, there will be a tie at Step 3 between the external route from GK2 and the local route through GW 1. Therefore, the local route will be selected in Step 4.

Central Routing Table

A further refinement of the routing algorithm discussed above is a central routing table for storage of the best route or routes selected above. In addition to the TBGP Call Routing Table discussed above, a central routing table called a Telephony Routing Information Base (TRIB) is useful. The TBGP Call Routing Table contains information about all the possible paths for a particular destination obtained through the TBGP routing update messages. But only the best route selected by the route selection algorithm discussed above (or multiple routes if the selected algorithm results in several equally good routes) is inserted into the TRIB. The entries in the TRIB represent the best path or paths for routing incoming calls at a given point in time based upon the most recent update messages.

Changes in the network configuration will result in update messages being sent into the network indicating that certain paths are no longer valid or are temporarily out of service. Receipt of an update message will trigger the running of the route selection algorithm to determine the best path and the invalid entry in the TRIB is replaced with a new entry reflecting the results of the route selection algorithm. An advantage of this approach is that the routing selection algorithm need only be run when an update message arrives that invalidates a path in the TRIB rather than each time a call is received.

The TRIB also enables support for additional Telephony routing protocols having their own Call Routing Tables but that to factor into the overall routing equation through the TRIB. The route selection algorithm can be extended to assign a priority among a number of different protocol types. Thus, routes available in the routing tables for a first protocol type are preferred for insertion in the TRIB over routes available in the routing tables of a second protocol type.

For example, say that TIGP (Telephony Interior Gateway Protocol) has its own routing update messages and TIGP routing table. The TIGP routing table could also include reachability information regarding the same destination as an entry in the TBGP routing table. Therefore, the TIGP routing table would include entries which would contend for an entry or entries in the TRIB.

Thus, there are multiple algorithms at play. First, each telephony routing protocol has to decide the best path or paths from the multiple paths it determines to a particular destination via the reachability information. Say, for example, that TBGP has routing table candidates C1, C2 and C3 to reach a destination D and TIGP has candidates C4, C5 and C6 to reach destination D. Also assume that C1, C2, C3, C4, C5 and C6 are all currently valid. Further assume that out of path entries C1, C2 and C3, TBGP determines that C1 and C2 are equal in cost and are better than C3. Also assume that out of C4, C5 and C6, TIGP determines that C4 and C5 are equal in cost and are better than C6. The final candidates of TBGP for insertion into the TRIB are C1 and C2 and the final candidates of TIGP for insertion into the TRIB are C4 and C5.

Next, assume that TBGP has a higher priority than TIGP, but TIGP has converged to the destination first, i.e. routing update messages for TIGP paths are received before routing update messages for TBGP paths. The priority of protocol types can be decided empirically and configured into the selection algorithm for a given routing entity. In this case, since there are no TBGP path entries for destination D, the TIGP entries C4 and C5 will be inserted into the TRIB as the best available paths to destination D. Subsequently, TBGP converges on the destination D and resulting in path entries C1, C2 and C3 and candidates C1 and C2 for insertion into the TRIB. Because TBGP has higher priority than TIGP, the TIGP path entries C4 and C5 in the TRIB will be replaced with TBGP path entries C1 and C2.

Now assume that TBGP routing update messages are received that indicate that path entries C1, C2 and C3 are no longer valid. The routing selection algorithm is then triggered to delete the TBGP entries C1, C2 and C3 from the TBGP call routing table and C1 and C2 from the TRIB. Since TIGP entries C4 and C5 are still valid, the routing selection algorithm will reinsert them in the TRIB.

Aggregation of Addresses

Three distinct types of IP Telephony Addresses have been discussed: E.164 numbers, Internet domain names, and L7IP addresses. Aggregation of L7IP subnets follows the same procedures used for aggregating layer 3 IP subnets in standard BGP.

Domain names exhibit a natural hierarchy, and can be aggregated as illustrated in the following example: sj.cisco.com and rtp.cisco.com can be aggregated into cisco.com. However, the aggregation of domain names must be manually configured unlike L7IP addresses which can be automatically aggregated. For example, when a Telephony BGP speaker receives two routes, one for 172.21.0.0/24 (i.e. 24 bits are fixed and the range is 172.21.0.0 to 172.21.0.511) and the other for 172.21.1.0/24 (i.e. 24 bits are fixed and the range is 172.21.1.0 to 172.21.1.511), it can automatically aggregate them to 172.21.0.0/23 (i.e. 23 bits are fixed and the range is 172.21.0.0 to 172.21.1.511). However, if it receives two routes, one for sj.cisco.com and the other for rtp.cisco.com, it can't automatically aggregate them to cisco.com because there may be other domains, e.g. sb.cisco.com, which use a completely different route.

Aggregating E.164 prefixes works similarly to the aggregation of L7IP addresses. However, because E.164 prefixes are decimal numbers, we can also define ranges prefixes. This means that, when a Telephony BGP speaker receives routes for prefixes: 406, 407, and 408, it can aggregate them into a single route for the range prefix 40{6.8}. Range prefixes 40{2 . . . 6} and 40{6 . . . 8} can aggregated to 40{2 . . . 8}. However 40{2 . . . 4} and 40{6 . . . 8} can not be aggregated, except using manual configuration, because they are not overlapping.

The aggregation of the AS_path attribute in Telephony BGP follows the same mechanism used in standard BGP.

When aggregating the voice_cost attributes for multiple routes, the aggregate voice_cost value is set equal to the largest individual value. For example, if the route for prefix 406 has a voice_cost of 5 and the route for prefix 407 has a voice_cost of 8, then the aggregated route 40{6 . . . 7} has an aggregate voice_cost of 8.

The present invention, as embodied in the Telephony BGP protocol supports most of the call scenarios discussed above. Calls involving multiple hops in the IP network, multiple translations between different Internet telephony protocols, and a single hop to the PSTN, are all supported. However, Telephony BGP as described above still cannot intelligently direct routes which hop off to the PSTN at one point and then hop back onto the IP network at a different point because of the way the PSTN is presently configured. Thus, the call scenarios depicted in FIGS. 7 and 8 above are not supported.

Figure 7:
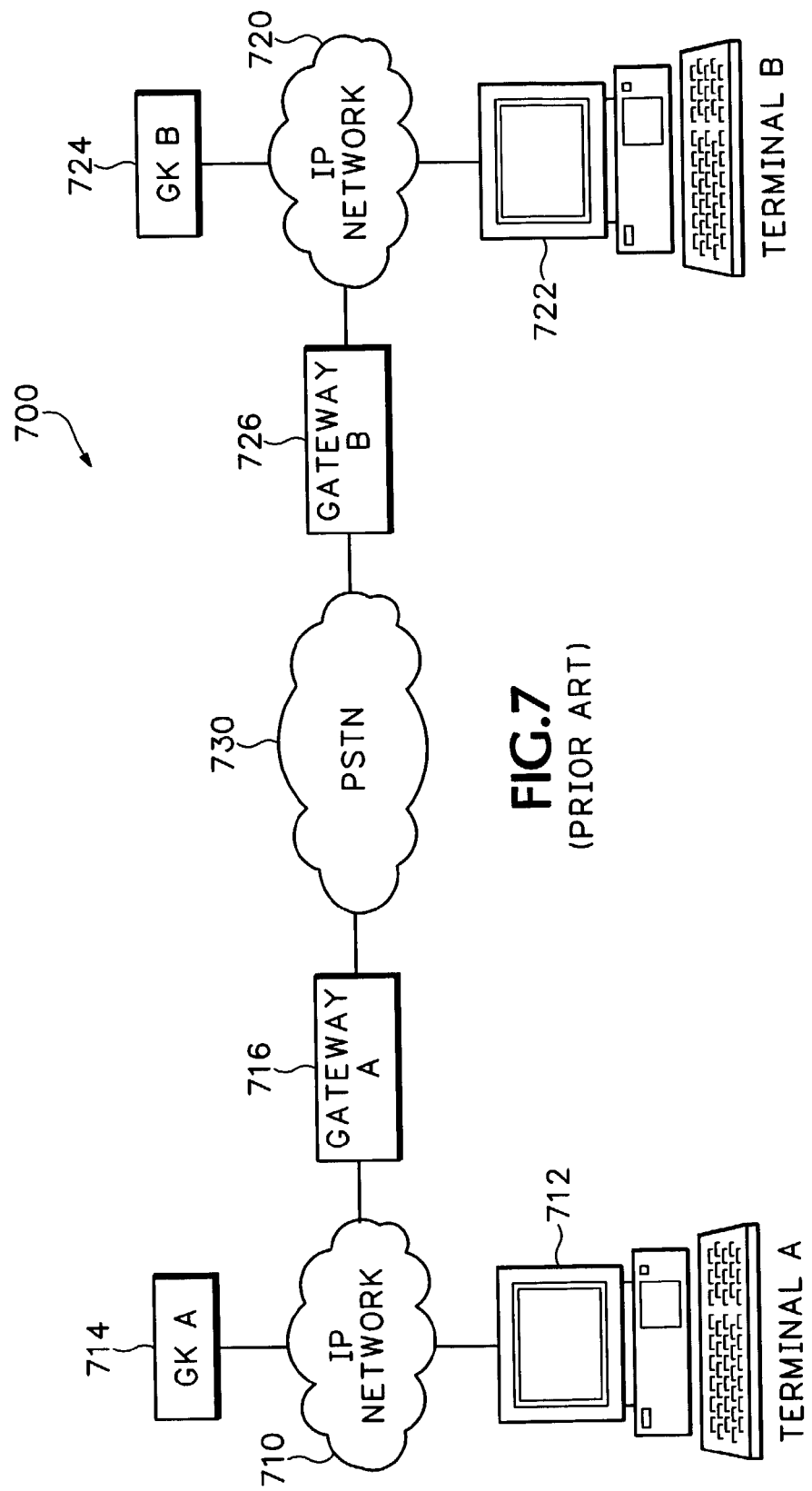
FIG. 7 is a functional block diagram illustrating an example of an Internet Telephony call from an IP network terminal through a voice gateway from the IP network to the PSTN, through another voice gateway from the PSTN to the IP network and terminating on another IP network terminal.
Figure 8:
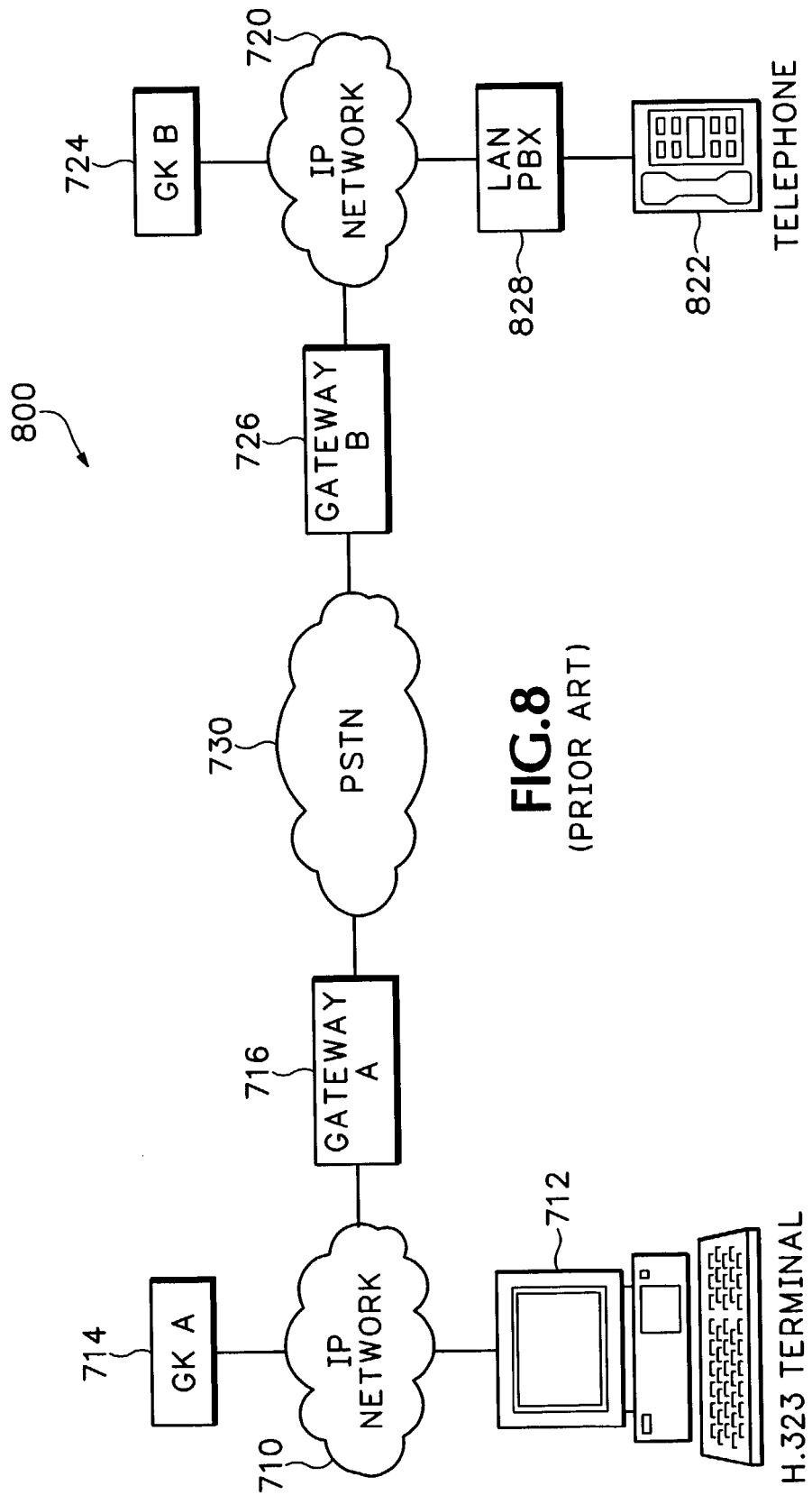
FIG. 8 is a functional block diagram illustrating an example of an Internet Telephony call from an fP network terminal through a voice gateway from the IP network to the PSTN, through another voice gateway from the PSTN to the IP network and terminating on a LAN/PBX which serves a telephone terminal.
Figure 11:
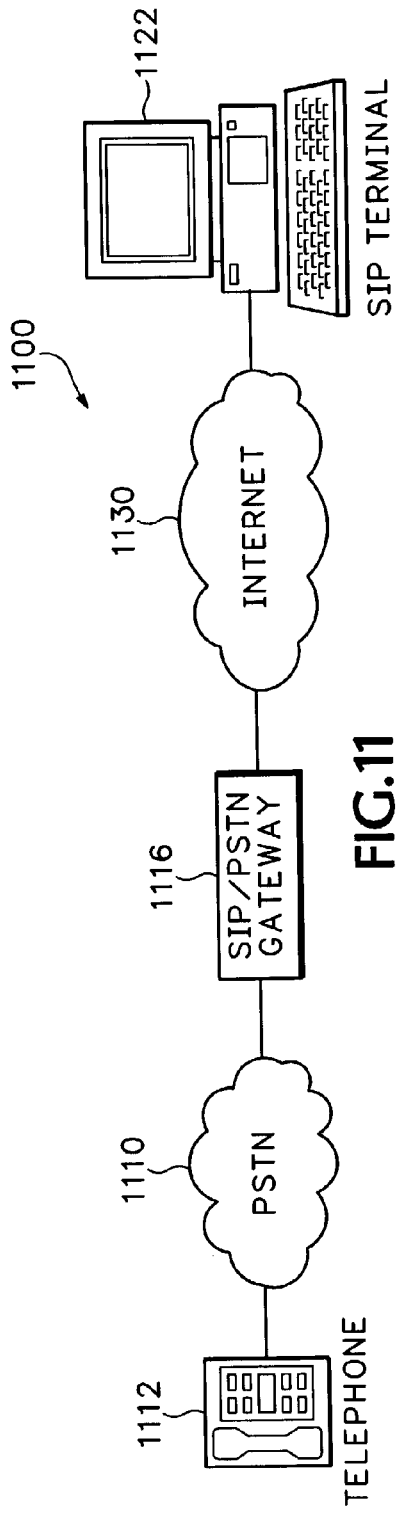
FIG. 11 is a functional block diagram illustrating an example of an Internet Telephony call from a PSTN terminal through an SIP/PSTN gateway to the IP network to an SIP terminal.
Figure 12:
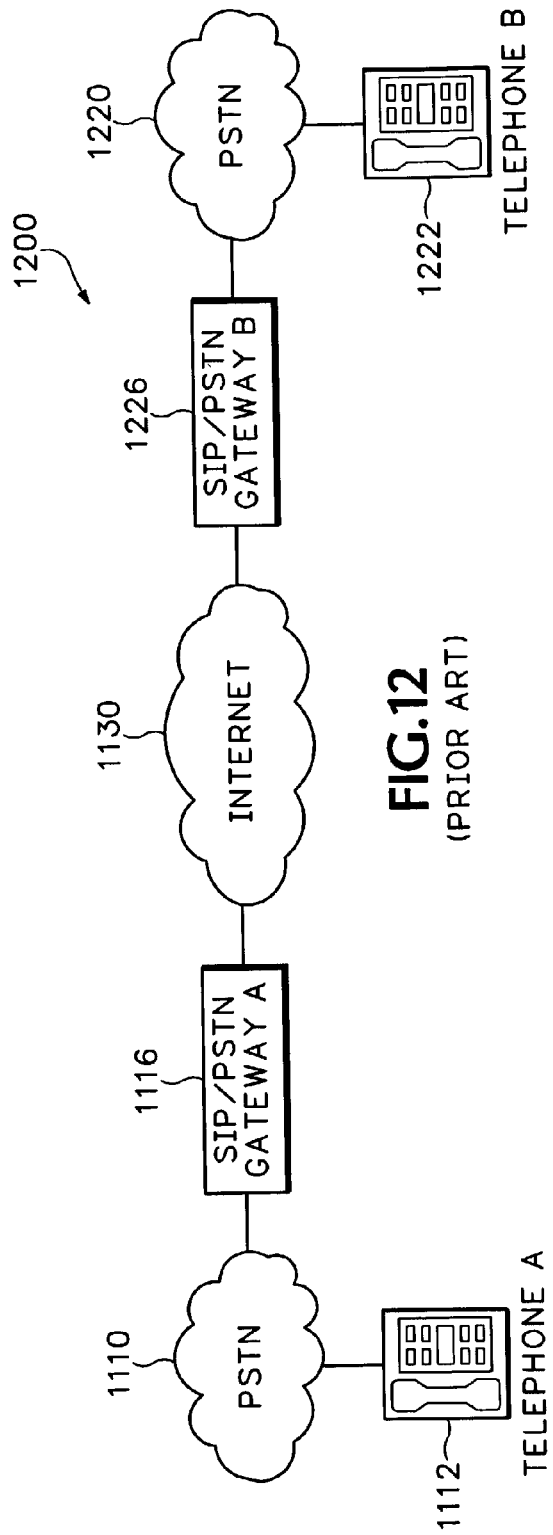
FIG. 12 is a functional block diagram illustrating an example of an Internet Telephony call from a PSTN terminal through an SIP/PSTN gateway to the IP network to another SIP/PSTN gateway to a PSTN terminal.
Figure 13:
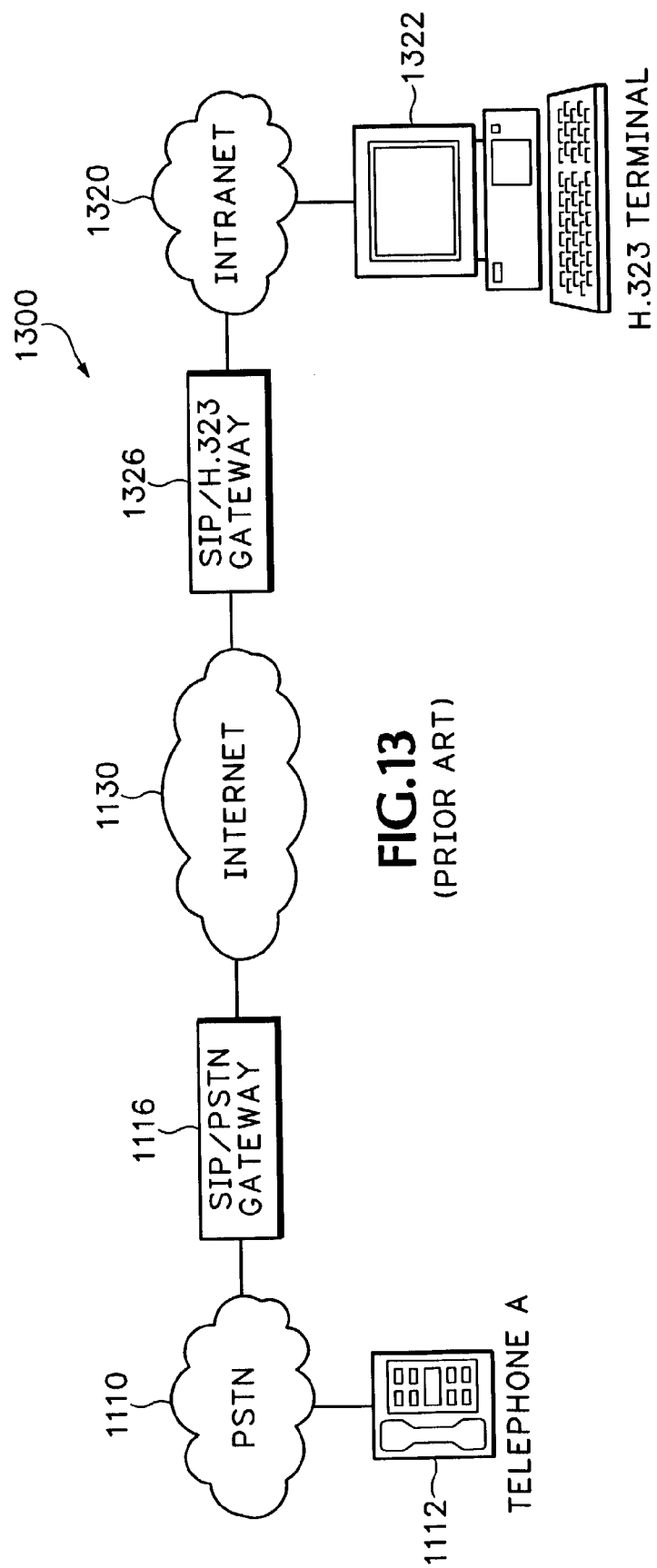
FIG. 13 is a functional block diagram illustrating an example of an Internet Telephony call from a PSTN terminal through an SEP/PSTN gateway to the IP network to an SIP/H.323 gateway onto an intranet and to a H.323 terminal.

The reason the present invention cannot be applied to the call scenarios of FIGS. 7 and 8 is that there is no means to exchange call routing information between the two IP networks across the PSTN. Even if the two IP networks of FIG. 7 were connected via the larger Internet, Telephony BGP still cannot propagate sufficient information about the destination IP network to the source IP network for the source IP network to construct a route involving a PSTN hop sandwiched between IP hops. This is because Telephony BGP is a path vector protocol. In other words, it advertises selected routes only and not the complete state of the network. The state of a destination IP network is gradually lost as the routes to that destination are propagated hop by hop.

Figure 22:
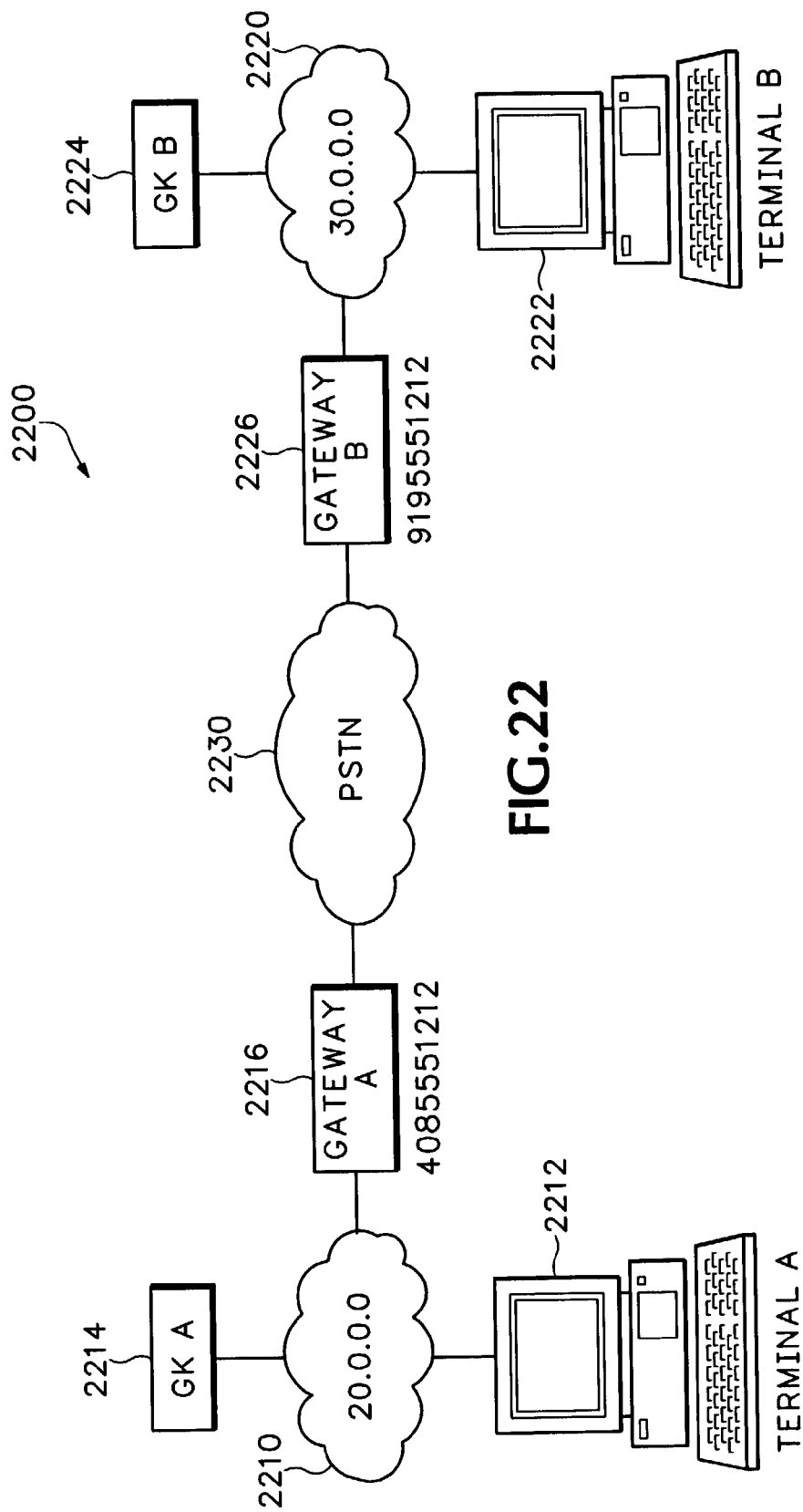
FIG. 22 illustrates an example of a voice call with a PSTN hop sandwiched between two IP hops.

This problem can be addressed through additional configuration of the Telephony BGP speakers at the interface between the IP network and PSTN. FIG. 22 shows an example.

In the topology 2200 of FIG. 22, a first Internet subnet 2210, having an IP network address of 20.0.0.0, includes a terminal 2212, a gatekeeper 2214 and a gateway 2216 to PSTN 2230. Gateway 2216 has a PSTN/E.164 phone number of 4085551212. Another Internet subnet 2220, having an IP network address of 30.0.0.0, has a terminal 2222, a gatekeeper 2224 and a gateway 2226 to PSTN 2230. Gateway 2226 has a PSTN/E.164 phone number of 9195551212.

In FIG. 22, the gatekeepers speak Telephony BGP. The following call routing entry is inserted on gatekeeper 2214:

| Destination | List of (List of Next Hop Network Address, Next Hop Protocol) |
|---|---|
| L7IP: 30.0.0.0/8 | {({E.164:9195551212}, POTS)} |

The voice_cost of this call routing entry should be set lower than the voice_cost for any other call route for the 30.0.0.0 network that may be learned from the Internet. When Terminal 2212 requests permission from gatekeeper 2214 to call 2222, gatekeeper 2214 resolves the address for Terminal 2222 to an address in the 30.0.0.0/8 network. Based upon the call routing entry above, gatekeeper 2214 directs the call from Terminal 2212 to Gateway 2216. Gateway 2216 consults gatekeeper 2214 for the next-hop for the call destination address. Gatekeeper 2214 instructs gateway 2216 to connect to 9195551212 on the PSTN 2230. Gateway 2216 connects to Gateway 2226. Gateway 2226 then consults its gatekeeper 2224 to resolve the destination address of the call and connects the call to Terminal 2222.

Thus, though the examples of FIGS. 20 and 16 above were discussed in a context where the voice_next hop attribute was a network layer/layer 3 IP address, the present invention can also be applied to an E.164 number as the next-hop. In addition, the next hop protocol may be POTS, not just Q.931, RAS, or SIP.

As in the Public Switched Telephone Network, a key function of an Internet telephony system is the routing of telephone calls. The routing of Internet telephony voice packets, while superficially similar to the routing of IP data packets, has many distinguishing characteristics which make IP routing protocols unsuitable for routing these calls. Similarly, the call routing techniques for routing telephone calls in the PSTN are only marginally applicable to the problem of routing Internet telephony calls in the IP network because of the very different architecture of the IP Internet from the PSTN. The present invention efficiently routes Internet Telephony calls through the topology of the Internet and through multiple domains.

Having described and illustrated the principles of the invention in a preferred embodiment thereof, it should be apparent that the invention can be modified in arrangement and detail without departing from such principles. For example, though the present invention is described in the context of routing voice calls for Internet Telephony, it will be understood by those of ordinary skill in the art that the present invention can be applied to the routing of packets based upon higher layer addresses, such as application layer/layer 7 addresses. Also, whereas routing agents are discussed above in terms of gatekeepers and other entities, it will be understood by those of ordinary skill in the art that the routing agent function can either be centralized in a single routing entity in an AS or distributed among several routing entities within the AS. We claim all modifications and variations coming within the spirit and scope of the following claims.

The invention claimed is:

1. A device to establish an IP phone call, comprising:
a processor configured to send and receive IP call routing update messages to establish the IP phone call over an IP network, the routing update messages including both network layer addresses to identify next hops in the IP network and application layer addresses to identify phone prefixes accessible from the next hops; and
a routing table comprising a plurality of entries and enabled to store information from at least some of the received routing update messages.

2. The call establishing device according to claim 1 wherein the routing update messages include communication protocols supported by the next hops.

3. The call establishing device according to claim 2 wherein the protocols include H.323, Session Initiation Protocol (SIP), Q.931, or Plain Old Telephone Service (POTS).

4. The call establishing device according to claim 1 wherein the network layer addresses are layer 3 IP addresses of the Open System Interconnection (OSI) model and the application layer addresses are layer 7 addresses of the OSI model.

5. The call establishing device according to claim 1 wherein the processor is enabled to use the entries of the routing table to establish call legs for the IP phone call.

6. The call establishing device according to claim 1 wherein the processor is enabled to receives IP phone call signaling protocols in the routing update messages and is enabled to uses one of the protocols associated with an identified one of the next hops to establish a call leg in the IP phone call.

7. The call establishing device according to claim 1 wherein the processor is enabled to selects one of the next hops according to cost values contained in the routing date messages.

8. The call processing establishing device according to claim 1 wherein the processor is enabled to assigns local preference values to the network layer addresses and is enabled to selects one of the next hops according to the local preference values.

9. A method to establish an Internet Protocol (IP) call connection over a network, comprising:
dynamically receiving IP call routing update messages from one or more next hops in the IP network, the IP call routing update messages including destination phone numbers accessible from the next hops and associated IP network layer addresses for the next hops;
receiving a called phone number;
selecting one of the next hops with the accessible destination phone numbers corresponding to the called phone number; and
using the IP network layer address associated with the selected next hop to establish a call leg of the IP call connection for the called phone number.

10. The method according to claim 9 including automatically exchanging the routing update messages between multiple network processing devices in the network and then establishing multiple call legs for the called phone number over the network according to the exchanged routing update messages.

11. The method according to claim 9 including:
receiving protocol identifiers in the routing update messages identifying IP call signaling protocols supported by the next hops; and
selecting one of the next hops according to the protocol identifiers.

12. The method according to claim 9 including:
storing the received routing update messages in a local routing table;
automatically modifying the received routing update messages by replacing the IP network layer addresses for the next hops with a local IP network layer address; and
advertising the modified routing update messages to neighboring network processing devices in the network.

13. The method according to claim 12 including identifying locally supported IP call signaling protocols in the modified routing update messages.

14. The method according to claim 12 including incrementing cost values in the received routing update messages and sending the incremented cost values in the modified routing update messages.

15. The method according to claim 9 including selecting one of the next hops according to cost values contained in the routing update messages.

16. The method according to claim 9 including:
assigning local preferences to the next hops;
identifying multiple next hops having the accessible destination phone numbers corresponding with the called phone number; and
selecting one of the identified next hops with a highest one of the local preferences as the call leg of the IP call connection.

17. A system for establishing an Internet Protocol (IP) call connection over a network, comprising:
means for dynamically receiving IP call routing messages from one or more next hops in the IP network, the IP call routing messages including destination phone numbers accessible from the next hops and associated IP network layer addresses for the next hops;
means for receiving a called phone number;
means for selecting one of the next hops with a destination phone number corresponding to the called phone number; and
means for using the IP network layer address associated with the selected next hop to establish a call leg of the IP call connection for the called phone number.

18. The system according to claim 17 including:
means for automatically exchanging the routing messages between multiple network processing devices in the network; and
means for establishing multiple call legs for the called phone number over the network according to the exchanged routing messages.

19. The system according to claim 17 including:
means for receiving protocol identifiers in the routing messages identifying IP call signaling protocols supported by the next hops; and
means for selecting one of the next hops according to the protocol identifiers.

20. The system according to claim 17 including:
means for storing the received routing messages in a local routing table;
means for automatically modifying the received routing messages by replacing the IP network layer addresses for the next hops with a local IP network layer address; and
means for advertising the modified routing messages to neighboring network processing devices in the network.

21. The system according to claim 20 including means for identifying locally supported IP call signaling protocols in the modified routing messages.

22. The system according to claim 20 including means for incrementing a cost values in the received routing messages and sending the incremented cost values in the modified routing messages.

23. The system according to claim 17 including means for selecting one of the next hops according to cost values contained in the routing messages.

24. The system according to claim 17 including:
means for assigning local preferences to the next hops;
means for identifying multiple next hops having the destination phone numbers corresponding with the called phone number; and
means for selecting one of the identified next hops with a highest one of the local preferences as the call leg of the IP call connection.

* * * * *